(12) United States Patent
Saxena et al.

(10) Patent No.: US 12,354,604 B2
(45) Date of Patent: Jul. 8, 2025

(54) DISTRIBUTED DISCERNMENT SYSTEM

(71) Applicant: DISCERN SCIENCE INTERNATIONAL, INC., Tucson, AZ (US)

(72) Inventors: Sailesh Saxena, Bellaire, TX (US); Aaron Elkins, San Diego, CA (US); David Mackstaller, Tucson, AZ (US); Brad Walls, Tucson, AZ (US); Anmol Bagbai, Bangalore (IN); Sudheer George, Kottayam (IN); Vellingiri Venkatachalam, Tiruppur (IN); Veera Venkata Durga Kalepusubrahmanyam, Hyderabad (IN); Surekha Aray, Hyderabad (IN); Srilaxmi Butukuri, Hyderabad (IN)

(73) Assignee: Discern Science International, Inc., Tuscon, AZ (US)

( * ) Notice: Subject to any disclaimer, the term of this patent is extended or adjusted under 35 U.S.C. 154(b) by 277 days.

(21) Appl. No.: 18/305,356

(22) Filed: Apr. 23, 2023

(65) Prior Publication Data
US 2023/0386467 A1 Nov. 30, 2023

Related U.S. Application Data

(60) Provisional application No. 63/363,494, filed on Apr. 24, 2022.

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01)

(58) Field of Classification Search
USPC .......................................... 704/270.1, 1–504
See application file for complete search history.

(56) References Cited

U.S. PATENT DOCUMENTS

| 9,524,464 B2 | 12/2016 | Davulcu et al. |
| 10,248,804 B2 | 4/2019 | Valacich et al. |

(Continued)

FOREIGN PATENT DOCUMENTS

| AU | 2023259604 A1 * | 12/2024 | ............. G06F 3/013 |
| CA | 2948390 A1 | 12/2015 | |
| WO | WO-2023212516 A1 * | 11/2023 | ............. G06F 3/013 |

OTHER PUBLICATIONS

Nathan Twyman et al, Autonomous Scientifically Controlled Screening Systems for Detecting Information Purposely Concealed by Individuals, Journal of Management Information Systems, Dec. 2014, Research Gate, Internet.

(Continued)

*Primary Examiner* — Marcus T Riley
(74) *Attorney, Agent, or Firm* — McAughan Deaver PLLC

(57) ABSTRACT

An example of a distributed discernment system including a discernment server and a communications interface permitting bi-directional communications to and from the discernment server; and a plurality of human interface devices, each including a speaker, a microphone, a processor running a local processing program, and a system interface permitting bi-directional communications between the human interface device and the discernment server, where the diagnostic program running on the discernment server is adapted to generate interview instructions provided to the interface devices and the interface devices are adapted receive interview instructions from the discernment server, present a verbal question to a human interviewee; receive and process sensor data from the microphone to determine whether the (Continued)

microphone sensor data corresponds to a complete human voice response to the presented verbal question.

20 Claims, 22 Drawing Sheets

(56) References Cited

U.S. PATENT DOCUMENTS

| | | | |
|---|---|---|---|
| 10,524,713 B2 | 1/2020 | Valacich et al. | |
| 2006/0093998 A1* | 5/2006 | Vertegaal | G06F 3/011 705/7.29 |
| 2012/0078623 A1* | 3/2012 | Vertegaal | G06F 3/013 340/3.1 |
| 2013/0188032 A1* | 7/2013 | Vertegaal | H04N 7/18 348/78 |
| 2013/0266925 A1* | 10/2013 | Nunamaker, Jr. | G09B 7/00 434/362 |
| 2016/0135751 A1 | 5/2016 | Valacich et al. | |
| 2017/0119295 A1 | 5/2017 | Twyman et al. | |
| 2017/0221483 A1* | 8/2017 | Poltorak | G10L 15/142 |
| 2017/0221484 A1* | 8/2017 | Poltorak | G10L 15/142 |
| 2018/0365784 A1 | 12/2018 | Sartori et al. | |
| 2020/0060598 A1 | 2/2020 | Palti-Wasserman | |
| 2020/0163605 A1 | 5/2020 | Valacich et al. | |
| 2020/0327212 A1 | 10/2020 | Kedem et al. | |
| 2022/0354401 A1* | 11/2022 | Burgoon | G06F 3/041 |
| 2023/0386467 A1* | 11/2023 | Saxena | G06Q 50/265 |
| 2024/0164674 A1* | 5/2024 | Saxena | G16H 50/20 |

OTHER PUBLICATIONS

Judee K Burgoon et al, An Approach for Intent Identification by Building on Deception Detection, 38th Hawaii International Conference on System Sciences—2005, Jan. 2005, Research Gate, Internet.
Lina Zhou et al, A Comparison of Classification Methods of Predicting Deception in Computer Mediated Communication, Jopurnal of Management Information Systems, Mar. 2004, Research Gate, Internet.
Mark Adkins et al, Advances in automated deception detection in text-based computer-mediated communication, Proceedings of the SPIE Defense and Security Symposium, Jan. 2004, Research Gate, Internet.
Lina Zhou et al, An exploratory study into deception detection in text-based computer-mediated communication, Proceedings of hte 36th Hawaii Conference on System Sciences—2003, Feb. 2003, Research Gate, Internet.
Nathan W Twyman, Automated Human Screening for Detecting Concealed Knowledge, The University of Arizona, 2012.
Lina Zhou et al, Automating Linguistics-Based Cues for Detecting Deception in Text-based Asynchronous Computer-Mediated Communication, Group Decision and Negotiation—Jan. 2004, 2004, Research Gate, Internet.
Bruno Verschuere et al, Autonomic and Behavioral Responding To Concealed Information: Differentiating Orienting and Defensive Responses, Psychophysiology—Jun. 2004, Research Gate, Internet.
Judee K Burgoon et al, Detecting Deception through Linguistic Analysis, Intelligence and Security Informatics Symposium, Tucson, Jun. 2003, Research Gate, Internet.
Judee K Burgoon et al, Detecting Concealment of Intent in Transportation Screening: A Proof-of-Concept, IEEE Transactions on Intelligent Transportation Systems, Apr. 2009, Research Gate, Internet.
Douglas C Derrick, Border Security Credibility Assessments via Heterogeneous Sensor Fusion, Intelligent Systems, IEEE, May 2010, Research Gate, Internet.
Douglas C Derrick et al, Detecting Deceptive Chat-Based Communication Using Typing Behavior and Message Cues, ACM Transactions on Management Information Systems, Aug. 2013, Research Gate, Internet.
Aaron C Elkins et al, Vocal Analysis Software for Security Screening: Validity and Deception Detection Potential, Homeland Security Affairs, Jan. 2012, Research Gate, Internet.
Aaron C Elkins et al, Predicting Users' Perceived Trust in Embodied Conversational Agents Using Vocal Dynamics, Article, Jan. 2012, Research Gate, Internet.
Douglas C Derrick et al, Eye Gaze Behavior as a Guilty Knowledge Test: Initial Exploration for Use in Automated, Kiosk-based Screening, Article, Oct. 2011, Research Gate, Internet.
Gabriel Tsechpenakis et al., Hmm-Based Deception Recognition From Visual Cues, Article, Jul. 2005, Research Gate, Internet.
Matthew L Jensen et al, Identification of Deceptive Behavioral Cues Extracted from Video, IEEE Explore, Conference Paper, Oct. 2005, Research Gate, Internet.
Thomas O Meservy et al, Deception Detection through Automatic, Unobtrusive Analysis of Nonverbal Behavior, Intellignet Systems, IEEE, IEEE Explore Oct. 2005, Research Gate, Internet.
Jay F Nunamaker, Jr et al, Establishing a Foundation for Automated Human Credibility Screening, Conference Paper, Jun. 2012, Research Gate, Internet.
Jay F Nunamaker, Jr. et al, Embodied Conversational Agent-Based Kiosk for Automated Interviewing,Journal of Management Information Systems, Jul. 2011, Research Gate, Internet.
Steven J Pentland, et al, A Video-Based Screening System for Automated Risk Assessment Using Nuanced Facial Features, Journal of Management Information Systems, Oct. 2017, Research Gate, Internet.
Douglas P Twitchell et al, Using Speech Act Profiling for Deception Detection, Lecture Notes in Computer Science, Jun. 2004, Research Gate, Internet.

* cited by examiner

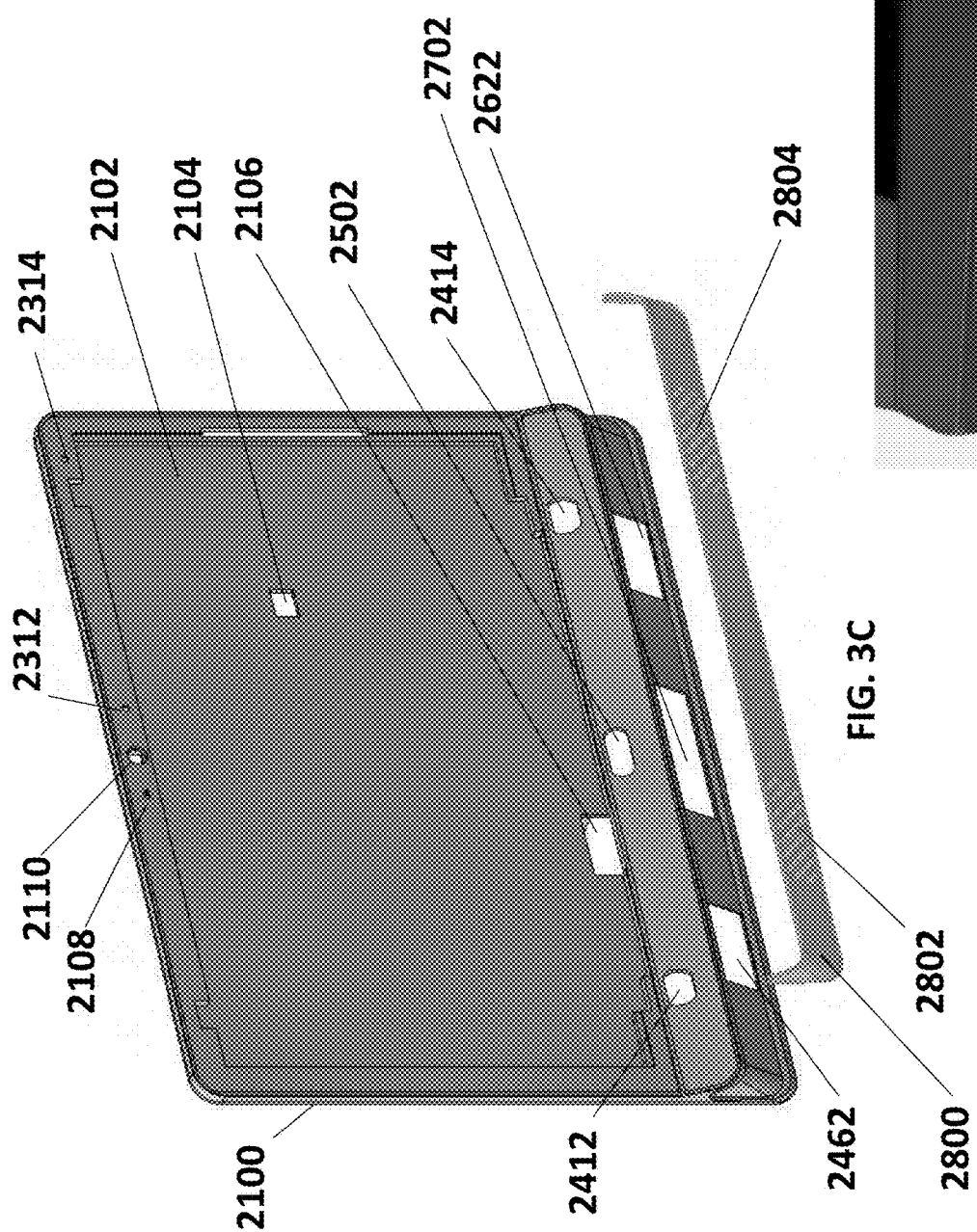
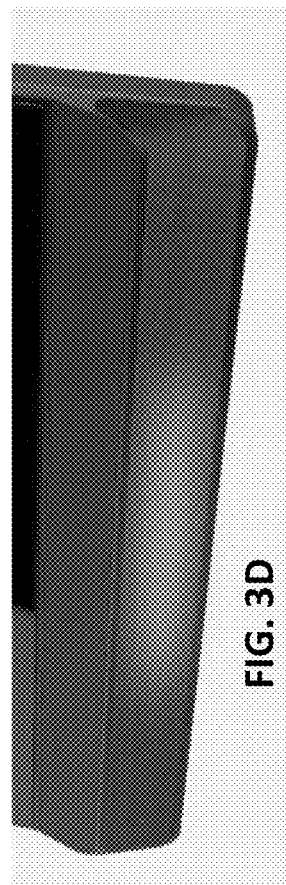
FIG. 3C
FIG. 3D

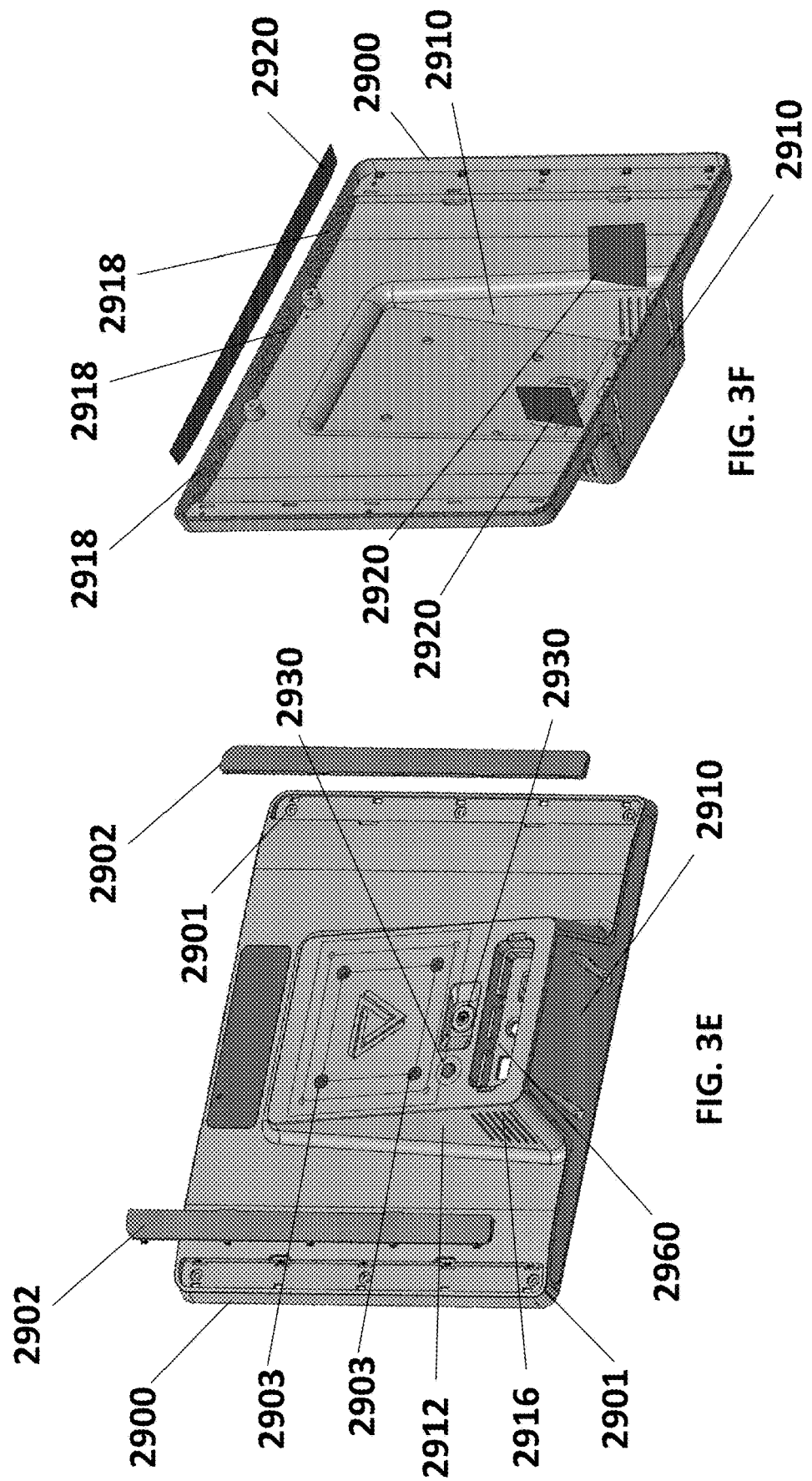

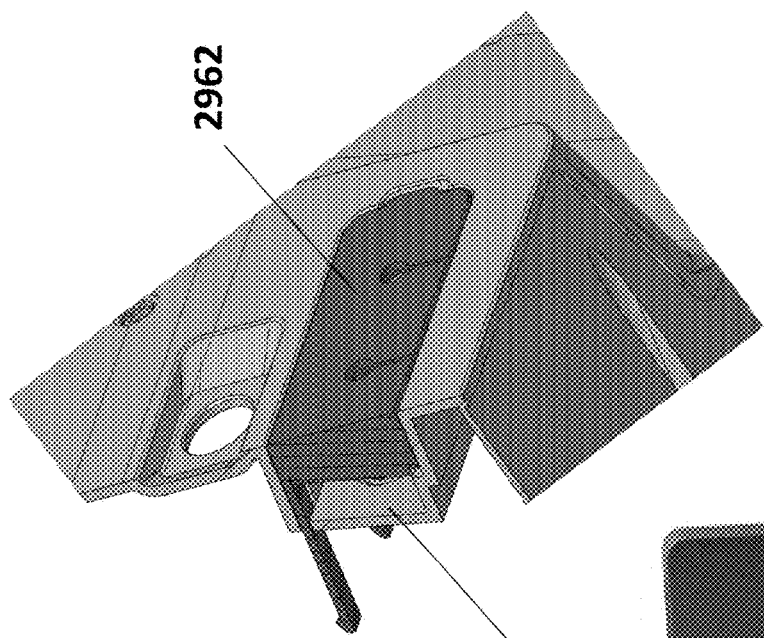
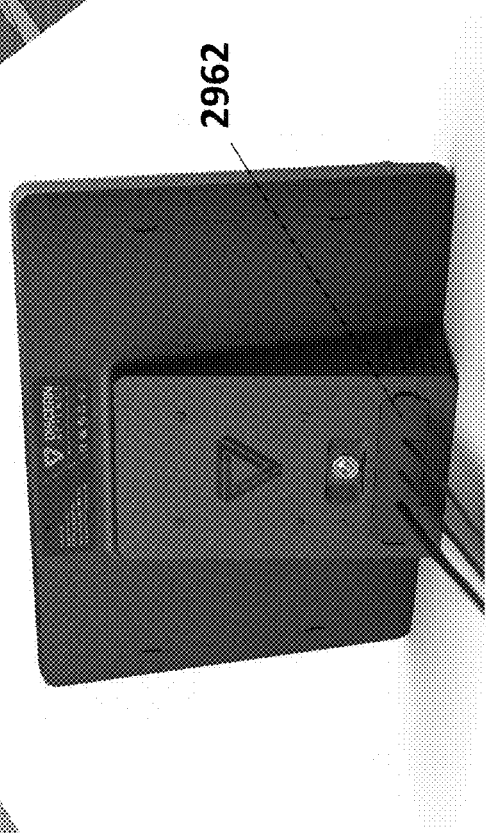
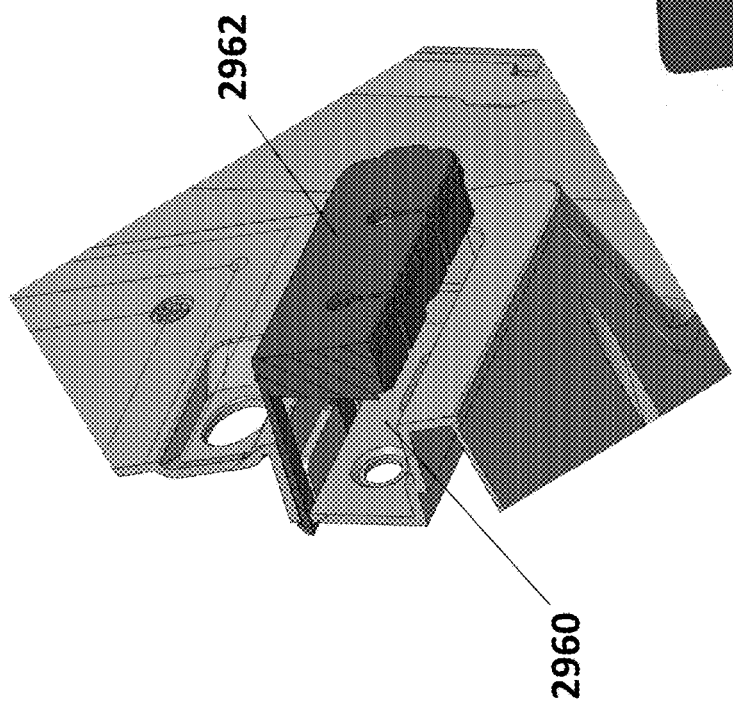
FIG. 3G-2
FIG. 3H
FIG. 3G-1

```
Q1STOP:      1644845122807000
A1START:     1644845124214000
A1STOP:      1644845129495000
Q2START:     1644845132845000
Q2STOP:      1644845137141000
A2START:     1644845138974000
A2STOP:      1644845145414000
Q3START:     1644845148549000
Q3STOP:      1644845156669000
A3START:     1644845158355000
A3STOP:      1644845165094000
Q4START:     1644845168414000
Q4STOP:      1644845172579000
NORESPONSE
Q5START:     1644845174712000
Q5STOP:      1644845178287000
NORESPONSE
```

FIG. 6

Q1STOP: 1644845122807000
A1START: 1644845124214000
A1STOP: 1644845129495000
Q2START: 1644845132845000
Q2STOP: 1644845137141000
A2START: 1644845138974000
A2STOP: 1644845145414000
Q3START: 1644845148549000
Q3STOP: 1644845156669000
A3START: 1644845158355000
A3STOP: 1644845165094000
Q4START: 1644845168414000
Q4STOP: 1644845172579000
NORESPONSE
Q5START: 1644845174712000
Q5STOP: 1644845178287000
NORESPONSE

DISTRIBUTED DISCERNMENT SYSTEM

CROSS REFERENCE TO RELATED APPLICATIONS

This application claims priority to U.S. Provisional Patent Application No. 63/363,494 filed on Apr. 24, 2022.

STATEMENT REGARDING FEDERALLY SPONSORED RESEARCH OR DEVELOPMENT

Not applicable.

REFERENCE TO APPENDIX

Not applicable.

BACKGROUND OF THE DISCLOSURE

Field of the Invention

The present disclosure relates to apparatus and systems for assessing the underlying state of a human in a distributed system.

Description of the Related Art

Accurate knowledge of the underlying state of a human being can be important for a variety of reasons. For example, knowing whether a particular human individual is acting with benign or malicious intent can be critical to the success of an organization of a process. Every organization is at risk of being victimized by individuals acting with malicious intent, such as hidden insiders or individuals seeking to access a location or service for improper purposes. For example, government entities are subject to spying attacks where individuals seeking to improperly obtain government, defense, and military secrets. In addition, governmental and industrial organizations are subject to theft, fraud, embezzlement, sabotage and industrial espionage, where technology, trade secrets and other forms of intellectual property are obtained improperly. Still further, locations and services such as stadiums, sporting events and airline travel are attacked by individuals seeking to inflict damages on the location or service (or individual at or associated with the service) through acts of terror or violence.

A significant challenge with addressing the threat posed by malicious individuals or groups is that they typically purposefully blend in and give no overt hints of their malicious intent. They try to hide in plain sight. They are not subject to easy categorization. They could be anyone from a senior officer of a company to a newly hired janitor. Many malicious actors have outstanding reputations, acknowledged for extraordinary performance, and are well-known to organizations they seek to damage. They can be clever and versatile at hiding the nature of their threats so that it is impossible to anticipate and protect against them, or to take countermeasures before appropriate mitigation processes are fully in place.

Despite the importance of being able to accurately assess the underlying state of human beings, prior attempts to do so have been limited both in terms of their likelihood of success and/or the challenges required for their implementation.

For example, human determination of the underlying state of another human being is generally inaccurate across a large number of situations.

While technology-focused attempts at deception have been attempted, they have not produced acceptable results. For example, one of the most widely-known technological approaches—the Polygraph—is generally deemed so inaccurate as to not be admissible in a court of law. While other approaches—such as an isolated kiosk-based device—have had more success than polygraphs, the general costs and logistical challenges associated with such systems have generally precluded their widespread adoption.

A further problem with conventional technology-based discernment efforts is that they are not easily scalable, are generally slow, and are not easily scalable.

It is an object of the disclosed subject matter to overcome the described and other limitations of the prior art.

BRIEF SUMMARY OF THE INVENTION

The present disclosure discloses a distributed system designed for automated behavioral analysis and credibility assessment of persons to detect hidden deception. The system conducts primary and secondary screenings of entrants using a virtual human agent and an array of non-invasive sensors to automate the analysis of a person's credibility, documents, and identity.

A brief non-limiting summary of one of the many possible embodiments of the present disclosure is a distributed discernment system comprising: a discernment server including a processer running a diagnostic program and a communications interface permitting bi-directional communications to and from the discernment server; a plurality of human interface devices, each human interface device including a speaker for presenting audible stimuli to a human interviewee, a microphone, a processor running a local processing program, and a system interface permitting bi-directional communications between the human interface device and the discernment server; and a communications network permitting bidirectional communications between the discernment server and each of the plurality of human interface devices wherein: the diagnostic program running on the discernment server is adapted to generate interview instructions to be provided to the plurality of human interface devices over the communications network, wherein the instructions provided to a given human interface device cause the human interface device to present audio stimuli to a human interviewee in the form of a verbal question; each of the plurality of human interface devices is adapted receive interview instructions from the discernment server over the communications network and the local processing system is configured, in response to such instructions, to: present audible stimuli to a human interviewee in the form of the verbal question; receive sensor data from the microphone following the presentation of the audible stimuli; process the microphone sensor data to determine whether the microphone sensor data corresponds to a complete human voice response to the presented verbal question; and if the microphone sensor data is determined to be a complete human voice response to the presented verbal question, provide data to the discernment server indicating that a complete response to the presented verbal question has been received; and the discernment server is adapted to receive data from each of a plurality of the human interface devices and analyze such data to provide an assessment of the state of the human interviewee interacting with each such human interview device.

Additionally or alternatively, each of the plurality of human interface devices may further comprises an eye tracker, and wherein the microphone generates a timestamped audio data stream; the eye tracker generates a timestamped eye tracking data stream, and wherein each of the plurality of human interface devices further comprises: means for streaming the timestamped eye tracking data stream and the timestamped audio data stream to the discernment server in such a manner that the data streams are associated with an interview ID; means for generating timestamps associated with the start and stop points of the presentation of the verbal question to a human interviewee interacting with such device; means for generating timestamps associated with the start and stop points of the human interviewee's response to the presented verbal question; and means for transmitting to the discernment server timestamped data associated with the start and stop points of the presented verbal question and timestamped data associated with the start and stop points of the human interviewee's response to the presented verbal question.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

FIGS. 3A-3H illustrate an exemplary embodiment of a local appliance 2000.

FIG. 8A illustrates an exemplary report interface.

Figure 1:
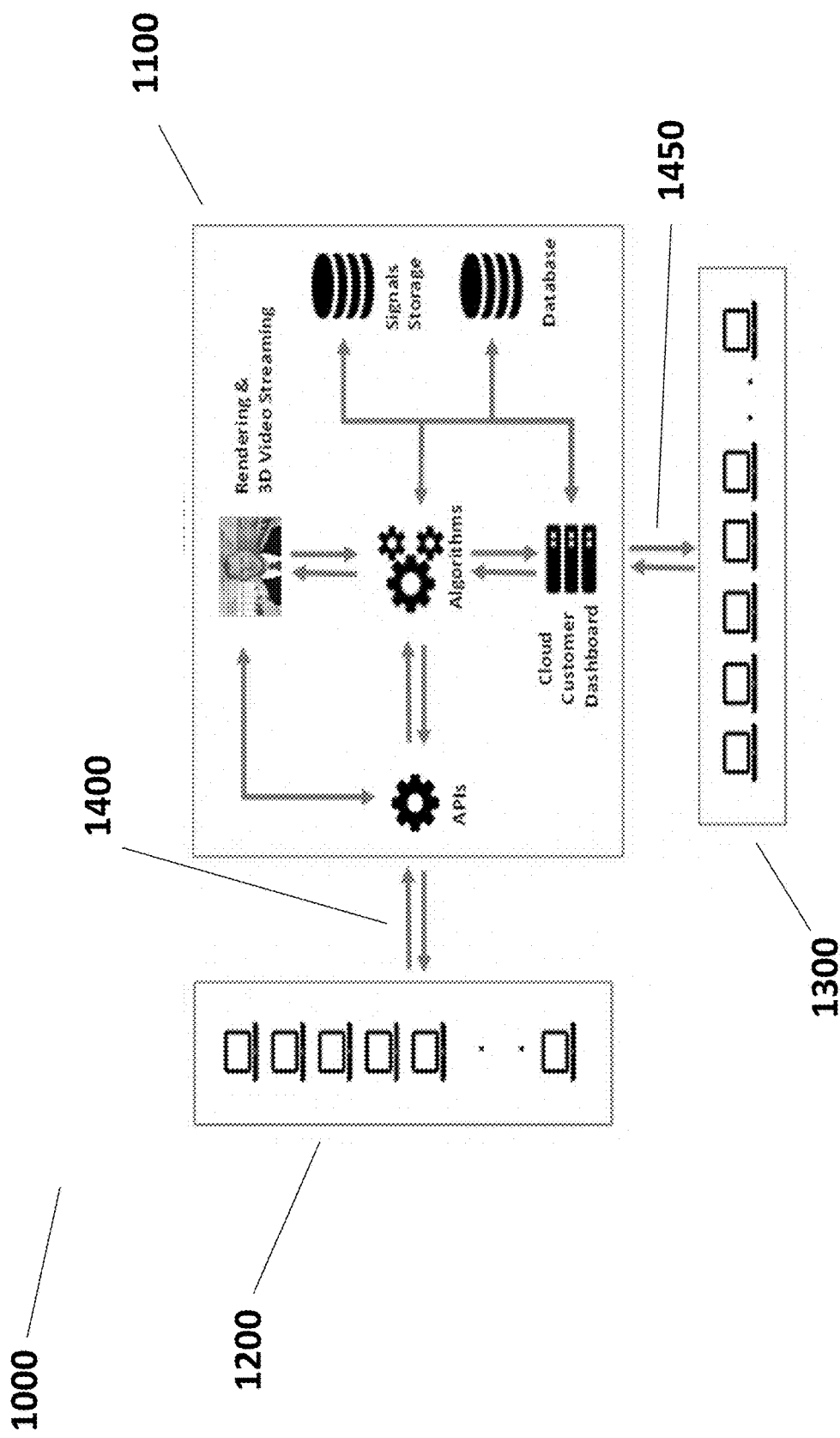
FIG. 1 illustrates an exemplary embodiment of a distributed discernment system 1000 constructed in accordance with certain teachings of this disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above, and the written description of specific structures and functions below, are not presented to limit the scope of what I have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Aspects of the inventions disclosed herein may be embodied as an apparatus, system, method, or computer program product. Accordingly, specific embodiments may take the form of an entirely hardware embodiment, an entirely software embodiment or an embodiment combining software and hardware aspects, such as a "circuit," "module" or "system." Furthermore, embodiments of the present inventions may take the form of a computer program product embodied in one or more computer readable storage media having computer readable program code.

Items, components, functions, or structures in this disclosure may be described or labeled as a "module" or "modules." For example, but not limitation, a module may be configured as a hardware circuit comprising custom VLSI circuits or gate arrays, off-the-shelf semiconductors such as logic chips, transistors, or other discrete components. A module also may be implemented as programmable hardware devices such as field programmable gate arrays, programmable array logic, programmable logic devices, or the like. Modules also may be configured as software for execution by various types of processors. A module of executable code may comprise one or more physical or logical blocks of computer instructions that may be organized as an object, procedure, or function. The executables of a module need not be physically located together but may comprise disparate instructions stored in different locations that when joined logically together, comprise the module and achieve the stated purpose or function. A module of executable code may be a single instruction, or many instructions, and may even be distributed over several different code segments, among different programs, and across several memory devices. Similarly, data may be identified and illustrated herein within modules, and may be embodied in any suitable form and organized within any suitable type of data structure. The data may be collected as a single dataset, or may be distributed over different locations including over different storage devices, and may exist, at least partially, merely as electronic signals on a system or network. Where a module or portions of a module are implemented in software, the software portions may be stored on one or more computer readable storage media.

When implementing one or more of the inventions disclosed herein, any combination of one or more computer readable storage media may be used. A computer readable storage medium may be, for example, but not limitation, an electronic, magnetic, optical, electromagnetic, infrared, or semiconductor system, apparatus, or device, or any suitable combination of the foregoing. More specific, but non-limiting, examples of the computer readable storage medium may include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this disclosure, a computer readable storage medium may be any tangible medium that can contain or store a program for use by or in connection with an instruction execution system, apparatus, or device.

Computer program code for carrying out operations of one or more of the present inventions may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an exterior computer for example, through the Internet using an Internet Service Provider.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and/or operation of possible apparatuses, systems, methods, and computer program products according to various embodiments of the present inventions. In this regard, each block in the schematic flowchart diagrams and/or schematic block diagrams may represent a module, segment, or portion of code, which comprises one or more executable instructions for implementing the specified logical function(s).

It also should be noted that, in some possible embodiments, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they do not limit the scope of the corresponding embodiments. Indeed, some arrows or other connectors may be used to indicate only the logical flow of the depicted embodiment. For example, but not limitation, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and computer instructions.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

The Overall Distributed System: FIG. 1 illustrates an exemplary embodiment of a distributed discernment system 1000 constructed in accordance with certain teachings of this disclosure. As illustrated in the figure, in this general embodiment, the distributed discernment system comprises four main components: (a) one or more cloud-based discernment server systems 1100; (b) a plurality of human interface devices 1200; (c) a plurality of administrative access devices 1300 and (d) one or more communication networks 1400, 1450 each permitting bi-directional communication between the cloud-based discernment server system (or systems) 1100 and the human interface devices 1200, for network 1400, and/or between the cloud-based discernment server system 1100 and the administrative access devices 1300, for network 1450.

The communication networks 1400, 1450 may comprise any suitable network for enabling bi-directional communications and may take the form of wired networks, wired networks, and networks comprising wired and wireless links. In exemplary embodiments, the communication networks 1400 and/or 1450 may include general Internet connections supported by existing infrastructure including Wi-Fi routers, Ethernet connections, fiber optic connections and any other suitable connection. The communication networks 1400 and/or 1450 may further include cellular networks, such as 4G or 5G networks.

In the exemplary embodiment, each of the human interface systems is used to support one or more interactions with a specific human. For purposes of this disclosure, a discrete grouping of interactions between the distributed discernment system and a human individual is referred to as an "interview" and the human individual involved in a given interview is referred to as an "interviewee."

It should be understood that an interview may consist of one or a more different interactions between the discernment system and a given interviewee, and that the interactions may take the form of the provision of various different stimuli to the interviewee and the detection of the response (or responses to those stimuli). For example, in one form, an interview could involve interactions where questions are visually presented to an interviewee and the interviewee is requested to respond by typing answers on a keyboard. In other embodiments, the interview could take the form of an interactive interface that utilizes a virtual person to conduct a verbal question-and-answer interrogation of the interviewee, where questions are posed verbally, and the interviewee is requested to articulate their response. In still other examples, the interactions could take the form of the presentations of images, sounds, smells, or the like to the interviewee and the determination of the interviewee's responses to those stimuli. Still further, the interactions comprising an interview could take the form of a combination of the above-described and other forms of stimuli.

In addition to presenting the communications giving rise to the interview to the interviewee, the human interface system will also detect certain reactions of the interviewee to the stimuli. For example, the human interface system can include microphones to capture the interviewee's audible response to presented questions. It can also include a camera and an eye tracker for detecting the interviewee's posture and eye gaze during the interview. It could also include a variety of other detectors and sensors for detecting other responses from the interviewee, such as posture changes, pulse rate changes, changes in skin activity (e.g., pore opening, sweating, temperature changes, etc.). As described in more detail below, the human interface system(s) will transmit data reflecting the sensed and detected attributes of the interviewee to one or more discernment server systems.

In the illustrated embodiment, the discernment server system(s) interacts with the human interface systems (through the communication system(s)) in such a manner that the discernment server system determines a variety of desired interactions for a given interview. These interactions can either be scripted—in the sense that for a certain interviewees or groups of interviewees—the same series of questions can always be presented in the same order or dynamic. In a dynamic interview, for a given interviewee, the discernment server system(s) will request the human interface system to establish certain interactions with the interviewee and will then use the responses received from certain initial interactions to determine which (if any) subsequent interactions to request.

At a high level the operation of this illustrated embodiment is as follows.

At a first time a system user (referred to herein as a Tenant or an Administrator) will configure the to define at least one interview. In general, each interview will be defined by a series of stimuli to be presented to the interviewee during the interview. In one example, this is done through the Administrator accessing a configuration portal through use of one of the administrative access devices 1300.

The, at a later time, the stimuli comprising the defined interview will be presented to the interviewee by the specific human interface system 1200 and the interviewee will interact with the human interface system in response to the one or more initial interactions. The response (or responses) received by the human interface system 1200 in response to the interview stimuli will then be transmitted from the human interface system 1200 to the cloud-based discernment server system 1100 (either with or without some local processing). The cloud-based discernment server system 1100 will then receive and process the received response(s) and, in response, may generate a subsequent set of requested interactions to be transmitted to the human interface system. The human interface system can then present the subsequent interactions to the interviewee, and receive responses from the interviewee. The process may be repeated a number of times with a number of subsequent interactions presented to the interviewee and a number of subsequent responses received by the discernment server system.

In the above example, once the interview is completed the cloud-based discernment server system 1100 can then process the received response to provide a general assessment of the underlying state of the interviewee. For example, in applications where the system is utilized to determine the extent to which the interviewee is likely to be engaged in malicious or unauthorized activity with respect to an employer, the discernment server system may generate an indication of the general assessed potential that the individual is (or is likely to engage in) malicious or unauthorized activity (e.g., deception detected, medium risk, low risk, no anomalies detected). As another example, in applications where the system is used for access control at a sporting event, the system may either automatically open a gate to permit an individual to pass through into the event or actuate a mechanism to direct the interviewee to an area dedicated to secondary or more through screening.

Once the interview data is processed, the cloud-based discernment system can then generate one or more notice or reports associated with the interview that can be made available to authorized Administrators through one or more of the administrative access devices 1300.

The embodiment depicted in FIG. 1 allows the activities described above to be performed concurrently in different locations and with respect to different administrators, interviews, and interviewees. Thus, for example, one administrator—associated, for example with an airline—may configure interviews that are used to screen multiple airline passengers for security risks while, at the same time, another administrator—for example, one interviewing employees for insider threat detection—may be conducting interviews of its employees to screen for embezzlement or theft of trade secret activities.

In the exemplary embodiment, customer interface apparatuses 1300 are also provided to allow authorized persons and entities to access the discernment server system for modifying or adjusting the discernment server system, receiving reports concerning the operation of the system, receiving analysis and/or reports concerning one or multiple human interactions conducted by the system, or for any other purpose.

By judiciously determining where and how various aspects of the described process are implemented, the embodiments of the present system provide a highly-flexible, highly-scalable, cost-effective and robust system for discerning the underlying state of humans suitable for a large number of applications.

Various aspects, and several of the many possible alternative embodiments of the exemplary distributed discernment system will be exemplified below. When considering the following written description it will be understood by those of skill in the art that the various embodiments are non-limiting and structural components and/or functional characteristics may be combined, a la carte style, to provide systems having various structural configurations and functionality. For example, and without limitation, as discussed in more detail below, each of the human interface systems in a particular embodiment of the distributed discernment system may take the form of any of a stationary system, a mobile system, a desktop system, a tablet-based system, or a smartphone system, and other interface systems that may be envisioned by those of ordinary skill in the art. The discussion of an embodiment utilizing desktops is in no way intended to preclude a system that would combine human interface systems having other forms such as a desktop form, a tablet form, and/or smartphone forms. Those ordinarily skilled in the art may practice the inventions taught and disclosed herein with these and many other forms and combinations. Accordingly, unless explicitly noted otherwise, all exemplary embodiments and all exemplary variant embodiments disclosed herein should be understood to be combinable with all other envisioned embodiments and variants to achieve the stated purposes and results of the inventions described herein.

The Human Interface System: As generally described above, each human interface system of the present disclosure is a system that permits the overall system to interface with one or more human interviewees to both: (a) present stimuli to a human interviewee and (b) receive and detect attributes of a human interviewee, including specifically responses from a human interviewee to provided stimuli.

Stimuli and Output Apparatus: The stimuli provided to each human interviewee, and the apparatus within each human interface system providing such stimuli, can vary depending on the application of the overall system. In a most basic case, the stimuli can consist solely of audible stimuli in the form of questions presented to the human interviewee. In such embodiments, the human interface system may necessarily include one or more audio speakers for providing the audible messages.

In more typical embodiments the stimuli provided by the human interface system may include audible stimuli (described above) and visual stimuli. As with the audible stimuli, the visual stimuli may take various forms including but not limited to words, static images, video clips, displayed 2D or 3D images, displayed physical objects, a virtual human agent (which could take the form of a 2D or 3D moving image, or a cartoon-like humanoid character), or any other suitable form.

Detected Attributes and Sensors: The specific interviewee attributes detected by the human interface system will vary depending on the application, the nature of the stimuli provided for a specific embodiment, and other factors, such as cost, size and bandwidth constraints that may be placed on the system. In many preferred embodiments, the detected attributes (and their associated detecting sensors) will be attributes that can be detected non-invasively (i.e., without making physical contact with the human interviewee). Such attributes include, for example, verbal responses, eye movement, general body posture, facial expressions, etc.)

In a basic case, the human interface system may include detectors for detecting audible/verbal responses from an interviewee, visual information concerning visible aspects of the interviewee and eye movement.

To detect audible/verbal responses a microphone (or microphone array) may be utilized. The received audible data can be analyzed to determine vocalic aspects of the interviewee's responses, such as pitch, pitch-changes, rate of speech, tempo, volume/intensity etc. The received audible data can also be processed to provide linguistic data related to the interviewee's response such as the specific informational content of the verbal response (i.e., what is being said such as "yes", "uh-hu", "I don't know", to much more complicated responses); the extent of pronoun usages as opposed to more specific references such as hedging, avoidance, etc.

To detect visual aspects of the interviewee, one or more cameras may be employed. To detect eye movement, one or more eyer trackers may be utilized. The eye trackers used in the disclosed system may take one of many forms. In certain examples, the eye trackers may be dedicated apparatus built into a specific device. Such dedicated eye trackers may include, for examples, eye trackers available from Tobii, Gazepoint, ISCAN or others.

The Interview and the Scheduling of Interviews: In one exemplary embodiment each human interface device will be a device that is capable of receiving from the cloud base discernment server 1100 data associated with an interview, collecting an interviewee's response to the stimuli associated with the interview and then transmitting the received data (after some processing) the cloud-based discernment server 1100 for processing.

In the example discussed herein, each interview is associated with a series of questions, with each question being associated with both audible stimuli to be presented to the user and some visual stimulation to be presented to the user with the audible stimuli. In the specific example discussed below, each question will take the form of a verbal question to the interviewee and an image that can take the form of an individual speaking to ask the verbal question and/or an image associated with the question. Thus for example, one question can take the form of 3D video image of a human attendant asking the interviewee "Did you pack your bags yourself?" As another example, another question can take the form of an image of a page from of an interviewee's passport associated with the question "Are you the person whose picture appears in this Passport?". It will be appreciated that the questions discussed above are exemplary only and that various other forms of questions can be implemented without departing from the scope of the present disclosure, including questions consisting of only images or sounds to which a human response will be detected.

In one embodiment of the system disclosed herein, the administrative access devices 1300, in conjunction with the cloud-based discernment server 1100 or another suitable processing system can be used to permit multiple administrators to define and manage a number of different questions. An exemplary portal that can be used for such activities is shown in FIG. 2A.

Figure 2A:
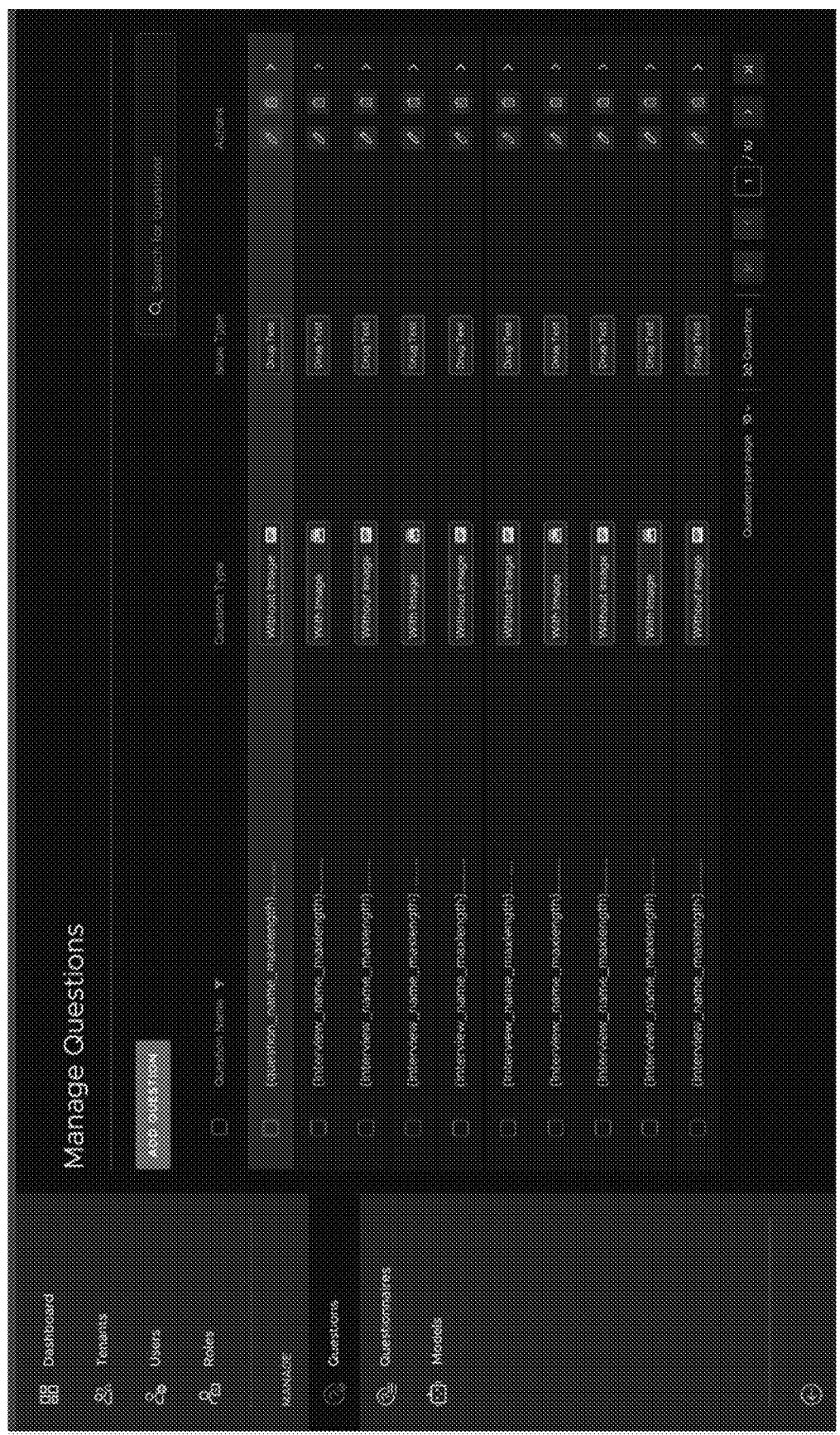
FIG. 2A illustrates a Manage Questions administrative portal that can be used by an administrator to manage various questions that can be used in interviews.

FIG. 2A illustrates a Manage Questions administrative portal that can be used by an administrator to manage various questions that can be used in interviews.

As depicted in FIG. 2A, the Manage Questions portal permits an administrator (or Tenant) to add questions to a list of available questions and modify/change adjust the data associated with existing questions. As reflected in FIG. 2A, in the exemplary system, the Manage Question portal permits an administrator to assign a question name, question type, issue type and action to a variety of questions.

This portal can be used to develop and maintain library of questions that the administrator can use to assemble one or more interviews.

In the illustrated example, the questions available to an administrator through the Manage Questions portal can include two types of questions. First, questions that will be available to all, or multiple administrators using the distributed discernment system 1000, including administrators associated with different organizations and groups. Such questions can include questions common to different types of interviews, such a, for examples: "Please state your name?"; "Are you the person whose name appears on this document?"; "Are you currently under the influence of alcohol or any non-prescribed drug or medication?". Second the Manage Questions portal can be used to create and maintain questions specific to—and accessible only to—one administrator or a particular administrator. Such questions can include questions of interest only to a particular administrator or group of administrators, such as—for example— "Have you ever intentionally left the West-Side gate open at the end of a shift?"; "Have you ever entered Office 3B on the Third Floor?"; "Do you recognize this individual?," "Are you currently seeking employment outside the Company?".

As reflected in FIG. 2A, in the illustrated example, each question can be configured to be a question type that is associated with an image or without an image. Each question can also be associated with a particular issue tyle such as, for example: "Drug Test"; "Security Test"; "Retention Test".

Figure 2B:
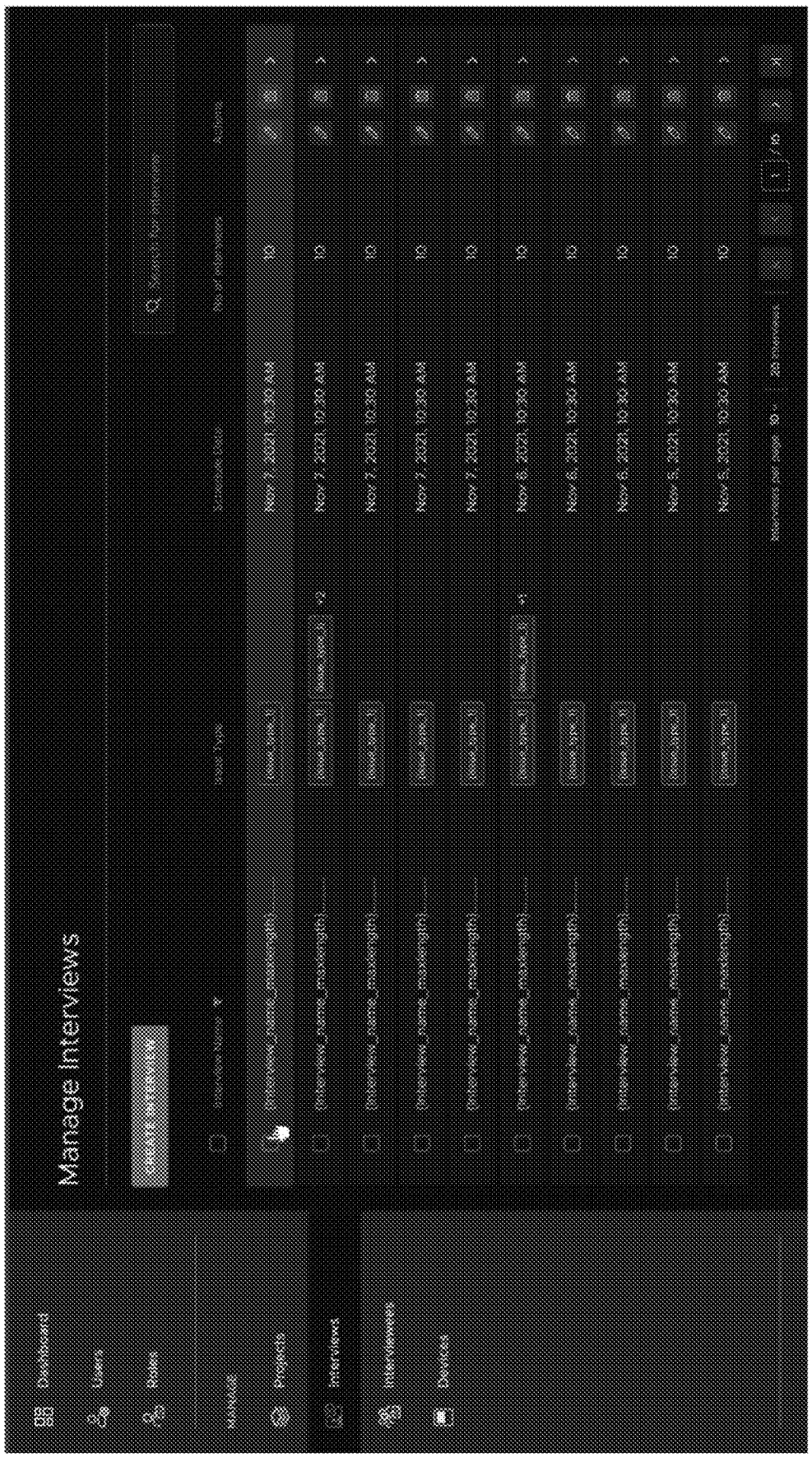
FIG. 2B illustrates an exemplary Manage Projects portal.

In the exemplary system disclosed herein, the administrative access devices 1300 can also be used by administrators to create and manage projects, where each project can be associated with a given interview, multiple interviews, or a given series of interviews. Each such project can be configured through a Manage Projects portal through which an administrator can define a project by name and associate various issues with that project. FIG. 2B illustrates an exemplary Manage Projects portal. As shown in the figure, each project can be assigned a project name, can be associated with different issues, and a description. As further reflected in FIG. 2B, a number of interviews can be scheduled for each project.

Although not reflected in FIG. 2B, each project can be associated with one or more specific interviews, with each interview associated with a specific sequence of questions selected from those questions within the Manage Questions library. In this manner, an administrator can configure the system to implement mule projects, or different administrators can configure the system to implement multiple projects, with each project being associated with a particular set of interviews and one or more particular issues.

Figure 2C:
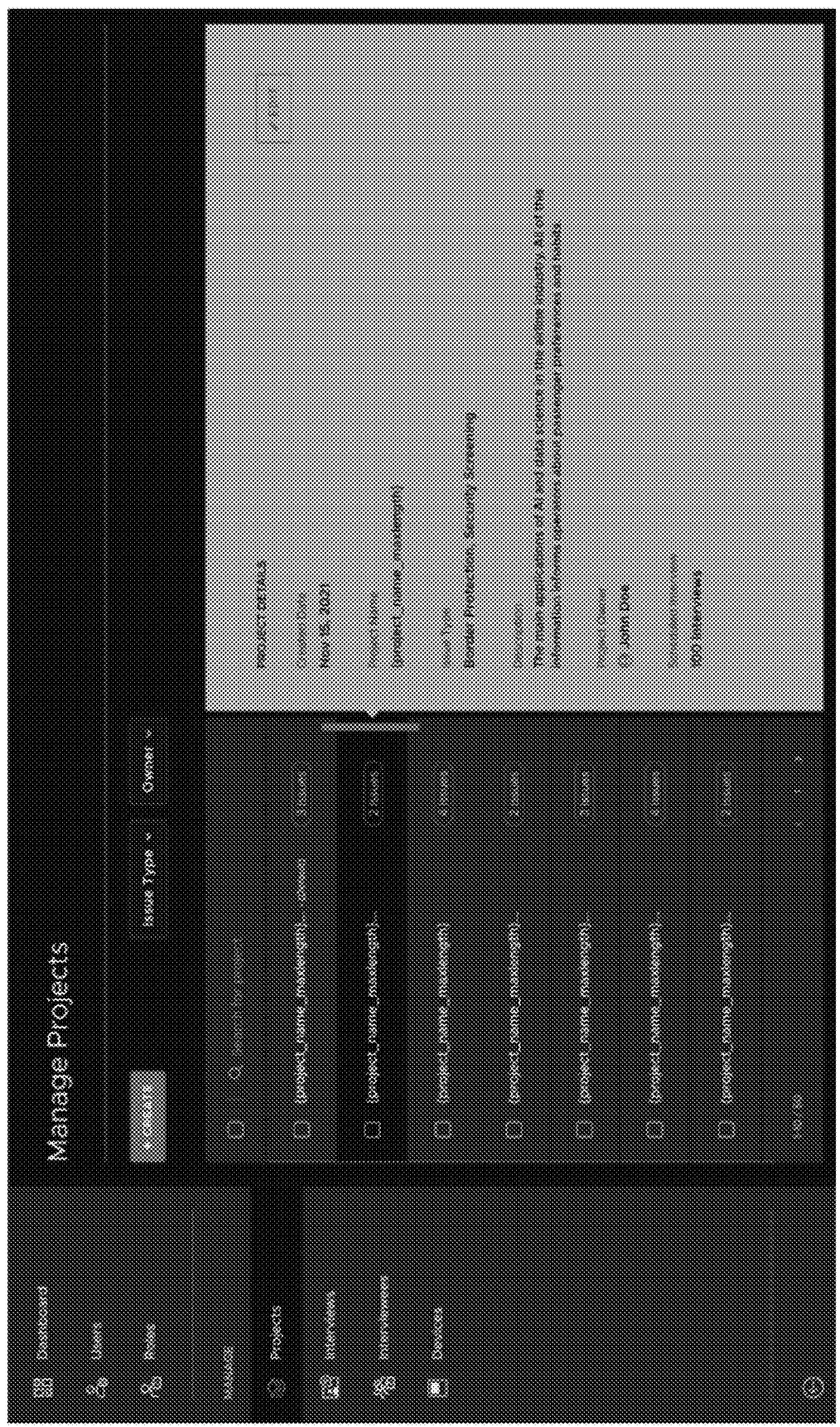
FIG. 2C illustrates a Manage Interview portal that can be used to configure interviews.

In the exemplary system, the various questions can be used to create one or more scheduled interviews, which can take place within a project. FIG. 2C illustrates a Manage Interview portal that can be used to configure interviews. As shown in the figure, each such scheduled interview can be associated with an interview name, the specific issues to be addressed in the interview, the date the interview (or interviews are to be conducted), and the specific number of scheduled interviews to be conducted on the specified date.

Although not illustrated in FIG. 2C, each scheduled interview can be—nut need not be—associated with a particular interviewee. Thus for example, a project is intended to interview all employees within a particular group in an organization, each scheduled interview may be associated with a particular employee. In other applications, such as airport screening, there may be a desire to have the interviews conducted on an anonymous basis (or on a basis where the interviewee's name is not known before the interview begins). For such applications, there will be no association—and at least no prior association—of the interviews and any interviewees.

It should be noted that the administrative access devices 1300 need not necessarily share data with the cloud-based discernment system 1100 for purposes of question creation, project management or interview management. Thus, for example, each different administrator or group utilizing the exemplary system can have their own administrative access devices that are isolated from and securely separated from the administrative access devices used by other administrators. Thus, for example, a first administrator associated with one group, such as an airline, can define questions, associated them into interviews, and create projects associated with such interviews in such a manner that the questions, interviews and projects are not accessible to any other administrator. As another example, an administrator who wants to arrange interviews of a group of specific employees, can arrange for interviews of those employees without any other administrator—or even the cloud-based discernment server—knowing what specific interviews will be conducted. All that the cloud-based discernment server will know, for example, is that interviews have been scheduled, that they will each include a defined number of questions.

In one exemplary embodiment, administrators desiring a high degree of security may be able to maintain their own separate, private and secure administrative access devices that can be used to define questions, interviews, projects and/or to manage interviews. In such embodiments, the cloud-based server will only have access to limited information concerning the interviews to be conducted, such as how many questions will be asked and data sufficient for the cloud-based server to ensure that the data associated with each question is provided to the human interface device 1200 conducting the interview and to ensure that the detected response to each question is provided to the cloud-based sever system 1100. The cloud based server-system—in such an example—can process the received data for each question and provide an indication to the specific administrative access device 13000 as to whether likely deception was detected with respect to each question. In this example, while the administrator with access to the administrative access device at issue may have knowledge of the nature of the specific question, and the specific identity of the individual interviewee who responded to the question, the cloud-based discernment system 1100 would not have such data. It would have conducted its analysis anonymously.

As the above makes clear, during operation of the exemplary system described herein for a specific interview, data associated with specific questions will be provided to a human interface device 1200 conducting the interview, which will present the questions to an interview, detect the responses and forward data associated with the responses to the cloud-based discernment system 1100. In one exemplary embodiment the data associated with each question (e.g., the data associated with the audio, visual and/or other stimuli) will be provided to the human interview device 1200 on a per question basis as the interview proceeds. In another exemplary embodiment, the data associated with multiple questions (and potentially all questions) will be provided to the human interview device 1200 in advance of each interview. In still other applications, the cloud-based discernment system 1100 may not provide the data associated with the various questions to the human interface device 1200, but may rather interact with one or more of the administrative access devices 1300 such that the administrative access device 1300 or devices 1300 provide the data associated with each question to the human interface devices 1200. In such applications, the cloud-based discernment server 1100 will receive data indicating that a question has been asked and data associated with the interviewee's responses. The cloud-based discernment server 1100 can then process the responses to provide an indication of whether they likely reflect a deceptive response.

The Physical Human Interface Device: In one embodiment, one or more of the human interface devices 1200 may take the form of a generally mobile integrated local appliance where the generally mobile integrated appliance may have a form factor somewhat like a tablet computer. FIGS. 3A-3H illustrates an exemplary embodiment of a local appliance 2000.

In the example of FIGS. 3A-3H, the local appliance 2000 is intended primarily to perform the functions of: (i) initiating an interview with each interviewee; (ii) presenting notices, data, information and stimuli to each interviewee for purposes of the interview; (iii) capturing data associated with each interview (e.g., received audio data; received video data; eye-tracking data; timing, etc.); and (iv) providing captured data to the cloud-based discernment system 1100 for processing by such system.

Figure 3A:
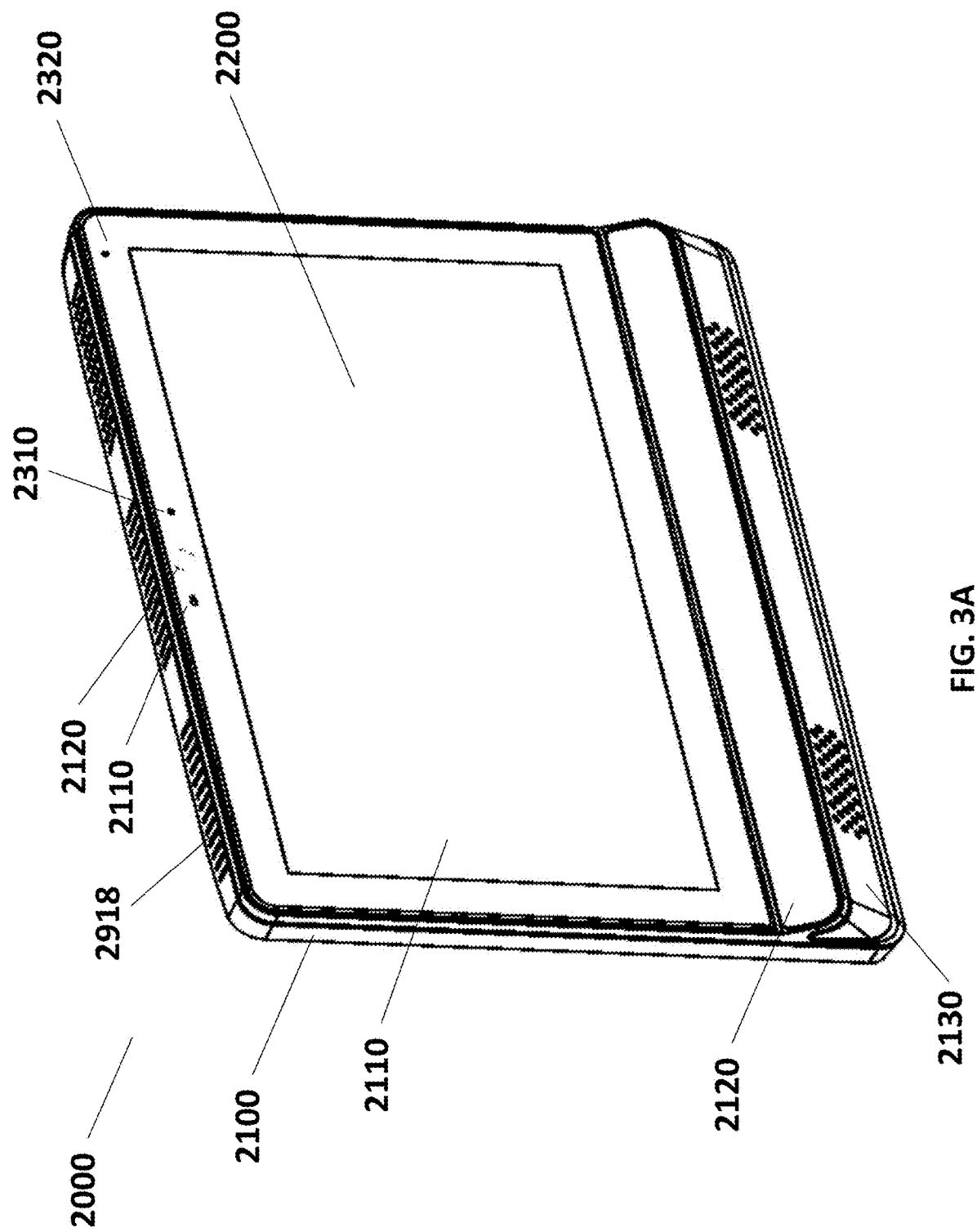
Figures 1, 3B:
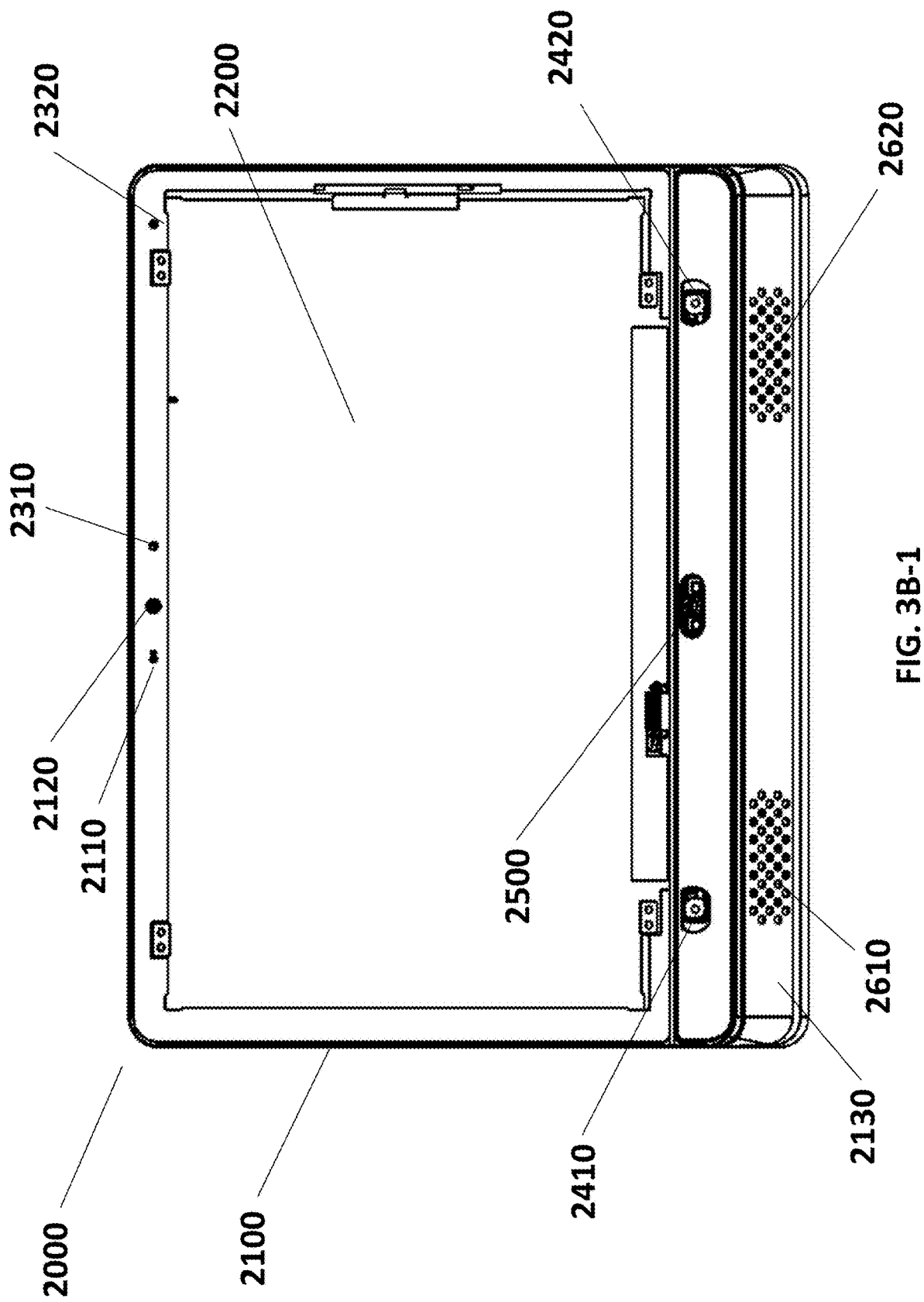

FIGS. 3A-3C provide a front external view of the local appliance 2000.

As best reflected in the FIG. 3A, the local appliance 2000 includes a front chassis element 2100 that may be formed, for example of metal or a metal blend such as a magnesium/aluminum blend. The front chassis element 2100 defines a first, generally flat section 2110; a second section 2120 that, in the illustrated example extends outwardly from the first generally flat section at an angle such that the upper surface of the second section will generally face upwards towards a user of the appliance; and a third section 2130 that generally faces forward from the local appliance 2100.

In the illustrated example, when the local appliance 2000 is positioned on a flat surface: (i) the first section 2110 is generally angled such that its exterior surface will be generally angled up towards an interviewee positioned in front of the appliance 2000; (ii) the second section 2120 is generally angled such that its exterior surface will be generally angled up towards an interviewee positioned in front of the appliance 2000 where the angle defined by the second section 2120 with respect to the horizontal is greater than the angle defined by the first section 2110 with respect to the horizontal; and (iii) the third section 2130 is generally angled downwards with respect to an interviewee positioned in front of the appliance 2000.

As discussed in more detail below, infrared illuminators and an eye tracker are associated with the second section 2120. It has been discovered that having the second section 2120 angled within a range of 10 (ten) to 20 (twenty) degrees with respect to the horizontal, and more specifically 15 (fifteen) degrees with respect to the horizontal is beneficial in that it allows the eye tracker to maintain appropriate tracking of an interviewee's eyes over a broad range of interviewee head and body movement.

While the above description used the term "interviewee" to refer to a person positioned in front of the local appliance, it will be understand that the term is intended to encompass any user of the appliance, such that it should be understood to include both those interacting with the appliance 2000 during the course of a formal interview and those interacting with the appliance as an administrator configuring the appliance, a technician configuring or repairing the local appliance, an individual being interviewed by the appliance, or any other person who interfaces or interacts with the appliance in any way.

As shown in FIGS. 3A and 3B a display screen 2200 for presenting video stimuli and interface information to a user is generally positioned within or on the first, generally, flat section of the chassis element 2100. The display screen 2200 may take the form of a generally flat-panel LCD display element.

A protective cover and/or bezel (not separately labeled) may extend over the front portion of the display screen and the front cover may extend over other elements and components of the appliance 2000. FIG. 3B-1 illustrates the embodiment of FIG. 3A with such covers/bezel's removed and FIG. 3B-2 illustrates the embodiment of FIG. 3B-1 with a speaker mesh element (discussed below) removed.

Figures 2, 3B:
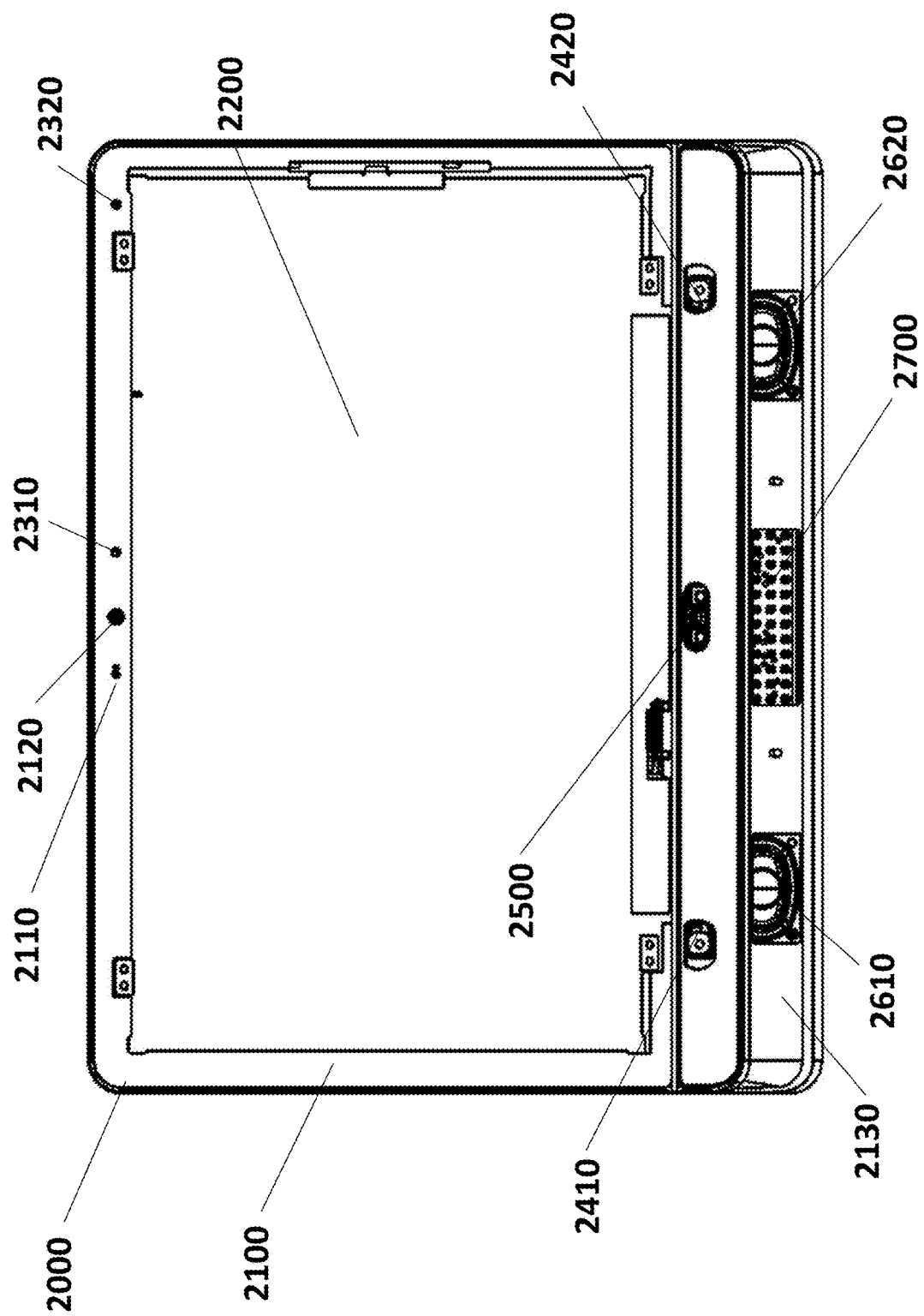

As FIGS. 3A, 3B-1 and 3B-2 reflect, the depicted exemplary local appliance 2000, various input and/or output devices and sensor or sensor-related elements are positioned around the display screen 2200. As shown in FIGS. 3B-1, 3B-2, and, in some respects, also in FIG. 3A, these devices, sensors, and sensor-related elements include an ambient light and/or proximity sensor 2210; a digital camera 2220 for capturing the facial image of an interviewee (hereinafter referred to as the camera or face camera); and multi-element digital microphone 2310, 2320 located along the top portion of the chassis element 2100 above the display screen 2200. In the illustrated example, the multi-element digital microphone is depicted as being formed from two elements 2310, 2310 but it will be understood that the multi-element digital microphone can include fewer or more elements. In one exemplary embodiment a third microphone element (not shown in FIG. 3A, 3B-1 or 3B-2, but that could be positioned on the rear side of the appliance 2000) could be used to, for example, filter out background noise and permit better identification of an interviewee's vocalic response.

In the illustrated example, the digital camera or face camera 2220 is located approximately at the midpoint of the width of the local appliance 2000, above the display screen 2200 and is designed to capture visible images. In the example, the ambient light and/or proximity sensor 2210 is located on one side of the camera at a location that is in substantially the same horizontal plane as the camera 2220 and that is located closer to the camera 2000 than to the side edge of the appliance. In the example, of FIGS. 3A and 3B-1 and 3B-2, the ambient light and/or proximity sensor 2210 is located within two (2) inches of the camera. In the illustrated example, two of the elements of the multi-element digital microphone 2310, 2320 are located on the side of the camera 2220 opposite the ambient light sensor and/or proximity sensor.

As shown on the figures, a first one of the digital microphone elements 2310 is located closer to the camera 2220 than to the side edge of the appliance, while a second one of the digital microphone elements is located closer to the side edge of the appliance than to the camera 2220. In the example of FIGS. 3A and 3B-1 and 3B-2, the first digital microphone element 2310 is located within two inches of the camera 2220 and the second digital microphone element 2320 is located within two inches of the side edge of the local appliance. As noted, both digital microphone elements 2310, 2320 are in substantially the same horizontal plane as the camera 2220 and the ambient light and/or proximity sensor.

As best shown in FIGS. 3B-1 and 3B-2 s, first and second infra-red illuminators 2410 and 2420 and an eye tracking sensor 2500 are located on the second, generally upward facing section 2120 of the chassis 2100. In the illustrated example, the eye tracking sensor 2500 is located substantially at a midpoint across the width of the appliance 2000 and each of the first and second infra-red illuminators 2410, 2420 are located along substantially the same horizontal plane as the eye tracking sensor 2500 and at locations that are closer to a side edge of the appliance than to the eye tracking sensor 2500. In the example of FIGS. 3B-1 and 3B-2, each infrared illuminator 2410, 2420 is located within two inches of a side edge of the appliance.

As further shown in the figures, and best reflected in FIG. 3B-2, first and second speaker elements 2610, 2620 are positioned on a plane below the second upward facing section of the chassis. As shown in the figures, in the illustrated embodiment, the plane in which the speakers are positioned extends downwardly from the second upward facing surface 2120 such that, when the appliance is resting on a surface, they will be directed slightly downward from the appliance 2000 towards the surface on which the appliance rests. As reflected in the figures, each of the two speakers 2610, 2620 is located closer to a side edge of the appliance than to the center of the appliance, such that each speaker includes a section that is within two inches of a side edge of the appliance.

In the exemplary embodiment, as best shown in FIG. 3B-2, a light interactive element 2700 is provided that takes the form of a light-emitting-diode assembly (and associated printed circuit board) is positioned between the first and second speaker elements 2610, 2620 substantially at the center of the appliance. As discussed in more detail below, the light interactive element 2700 can be used to provide visible cues to a user of the appliance 2000. In one exemplary embodiment, the light interactive element comprises a 3×12 LED array.

In one exemplary embodiment of the appliance depicted in example of FIGS. 3A and 3B-1 and 3B-2, the first and second speaker elements 2610, 2620 and the light interactive element 2700 are positioned behind a mesh element to which speaker fabric is attached. Details of such an embodiment are shown in FIGS. 3C and 3D.

FIG. 3C illustrates details of the front chassis 2100 within the display screen removed. As shown in the figure, the front chassis 2100 is formed such that it includes a recessed area 2102 for receiving the display screen and openings 2104, 2106 for enabling connections to and airflow to and from the rear side of the display screen. The chassis 2100 also defines openings and/or recesses 2108, 2110 for coupling to and/or passage of light through and from camera and ambient light sensing and/or proximately sensing elements 2220, 2100. In the example of FIG. 2C, the chassis 2100 further defines elements 2312, 2314 for receipt of first and second digital microphone elements 2310, 2320.

As further shown in FIG. 2C, the exemplary chassis 2100 further defines openings 2412, 2414 permitting attachment of and/or communication with, first and second infra-red illuminators (described above) and an opening 2502 permitting access to an eye tracking sensor.

As still further shown in FIG. 2C, the exemplary chassis 2100 defines openings 2612, 2622 for attachment and/or communication with first and second speakers and an opening 2702 permitting access to a light interactive element. As shown in FIG. 3C a speaker mesh element 2800 is positioned across the front of the chassis 2100 to cover the first and second speaker elements and the light interactive element. As depicted, the speaker mesh element 2800 includes groupings of a plurality of openings 2802, 2804 to permit the passage of sound therethrough.

The speaker mesh element 2800 may be formed from a frosted polycarbonate and can perform two functions. First, the speaker mesh element 2800 may provide a base to which a speaker fabric material may be attached to both block passage of material from the exterior of the appliance to its interior and improve the aesthetic appearance of the appliance. Second, because the speaker mesh element 2800 is formed of a frosted, light-transmissible material, it can act as a diffuse light spreader to diffuse and spread the light emitted from the light interactive element.

FIG. 3D generally illustrates the appearance of the speaker-containing portion of the appliance 2000 once speaker fabric 2806 is attached to the speaker mesh. The figure also illustrates the manner in which the speaker mesh can generally diffuse the light provided by the light interactive element.

In certain embodiments the main structure of the local appliance 2000 will be formed through the coupling of a back cover element cut to the front chassis element 2100 described above. FIGS. 3E and 3F illustrate aspects of such an exemplary back cover element 2900 with FIG. 3E illustrating the rear, externally visible, aspects of the back cover element 2900 and FIG. 3F illustrating the interior side of the back cover element 2900. The back cover element 2900 may be formed from plastic, polycarbonate, ABS, or a blend of any of the foregoing.

Referring first to FIG. 3E, it will be seen that the exemplary back cover defines several openings 2901 (only two of which are identified in FIGS. 2E and 2F) through which connecting elements, such as screws, may be passed to connect the back cover 2900 to the front chassis 2100. Screw caps 2902 may be used to cover these openings once the connection is made.

As further shown in FIGS. 3E and 3F, connecting components 2903 (two of which are labeled in FIG. 3E) may be included in the back cover to permit connection of various mounts to the appliance. For example, connecting elements in the form of screw or bolt-receiving receptacles may be located within the back cover to enable mounting structures complying with the VESA standard for mounting devices.

In the illustrated example the back cover defines a flat, generally rearwardly-extending portion 2910 that can form a base that enables the appliance to stand upright on a flat surface. As shown in the figure, this extending portion extends from a first point on the back cover to an extended point such that it defines generally triangularly-shaped side sections 2912 (only one of which is labeled in FIG. 3E. As best shown in FIG. 3F, this rearwardly extending portion defines an interior cavity 2914 in which larger components of the appliance (such as the battery) may be positioned.

As further shown in FIG. 3F, the back cover defines a number of thermal vents, including side thermal vents 2916 located near the bottom of the back cover 2900 on both sides of the triangular sections and upper top vents 2918 located along the top of the back cover. These thermal vents are arranged such that they can permit hot air and gasses to flow from the interior of the appliance, through the top thermal vents 2918, to the ambient environment. These vents also permit the flow of generally cooler ambient air into the interior of the local appliance 2000 (through the side vents 2916) upon over and across the internal elements in the appliance (so as to cool them) and then out of the appliance through the top vents 2918.

As shown in FIG. 3F anti-dust fabric elements 2920 can be coupled to the interior portion of the back-cover across the thermal vents to limit the passage of dust or other materials from the outside of the appliance to its interior.

In the example of FIGS. 3E and F, additional features may be formed in the rear-portion of the back cover, such as a Kensington security lock feature 2930.

Another additional feature may be a recessed area 2940 for supporting an appliance ON/OFF button. The use of a recessed area, located at the rear portion of the appliance (when the appliance is facing an interviewee) is beneficial because it prevents inadvertent activation/deactivation of the appliance and because the recessed, rear-located ON/OFF button makes it generally unobservable and inaccessible to an interviewee such that interviewees will not likely be motivated or inspired to depress the button (or switch).

One additional feature that may be formed into the back cover is a soft-locking recessed connection port 2960 such as the port shown in FIG. 3E. As reflected in the figure, the soft-locking recessed connection port defines a recessed area that provides for openings through which one or more connections can be made to the components positioned within the interior of the appliance. Such connections can include, for example, power connections, audio/visual connections (e.g., HDMI), and data connections (such as a USB connection).

Although not separately illustrated in FIG. 3E or 3F, an anti-skid pad may be affixed to the bottom of the appliance to inhibit movement when the appliance is placed on a flat surface. Additionally, protective lenses and/or bezels may be placed over various components within the appliance.

FIGS. 3G-1 and 3G-2 illustrate the manner in which the oft locking recessed connection port 2960 described above can be used to form soft-locking port. As shown in these figures a flexible locking port cap 2962 may be provided that includes finger elements that engage with openings in the back cover and shaped openings suitable for receiving cables connected to various connecting elements. As shown in the figures, the flexible locking port cap is movable form a first, unlocked position, as shown in FIG. 3G-1 to a second, locked position, as shown in FIG. 3G-2. In the unlocked position access to the connecting ports within the recess is readily provided such that connections can be made and any connecting cables can be placed within the shaped openings. As shown in FIG. 3G-2, the flexible locking port 2962 can then be moved to a locked position where it is held—via compression—within the connection recess such that the connections are secured and the connecting elements are protected from the ambient conditions. In one example, the flexible locking port is formed from compressible thermoplastic polyurethane.

FIG. 3H illustrates an example where a flexible locking port cap (with three shaped openings as opposed to the two shown in FIGS. 3G-1 and 3G-2) is shown in its soft locked position.

Figure 4A:
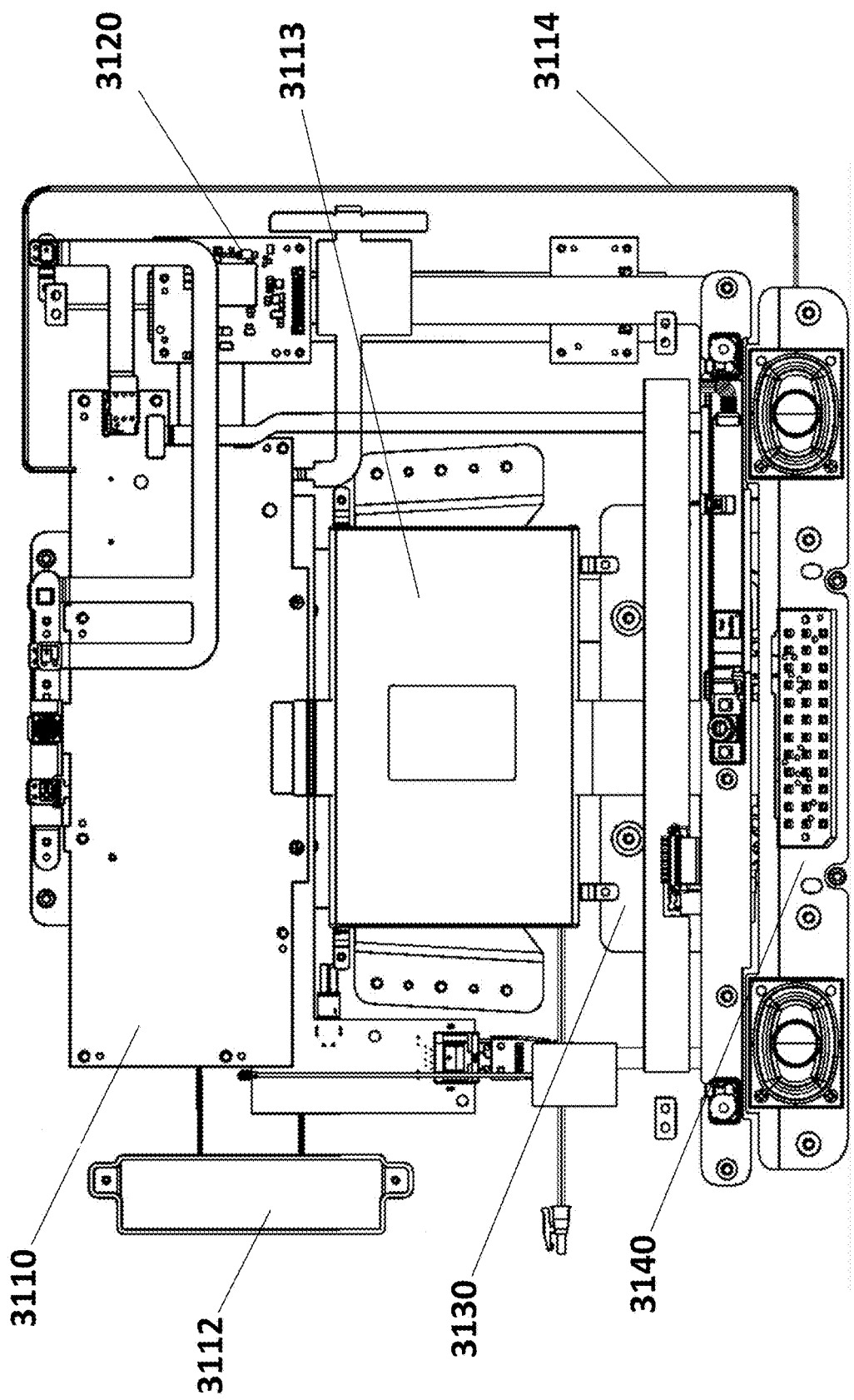
FIGS. 4A-4C illustrate various components and elements positioned within the interior space defined by the chassis 2100 and the back cover 2900.
Figure 4B:
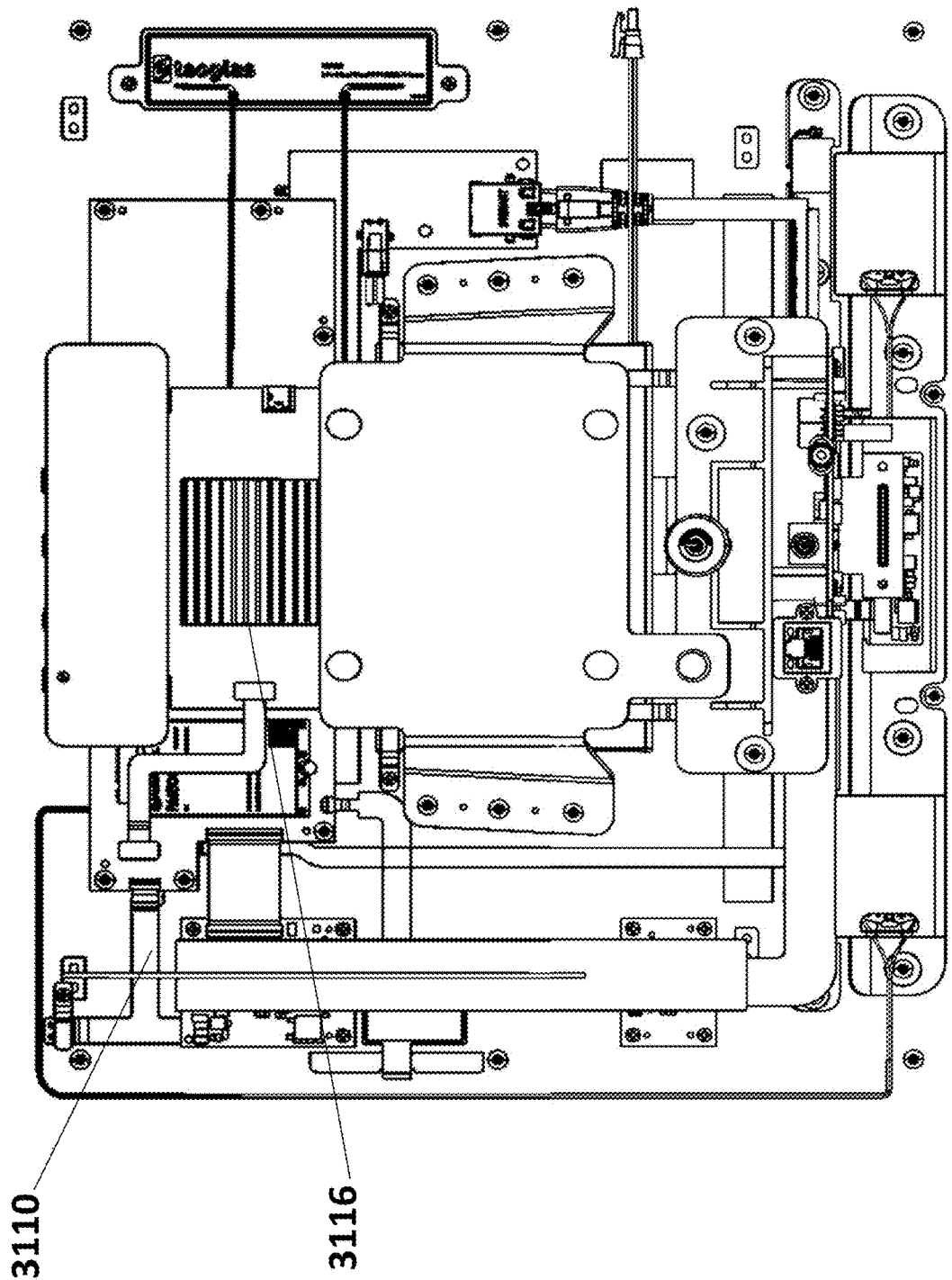
Figure 4C:
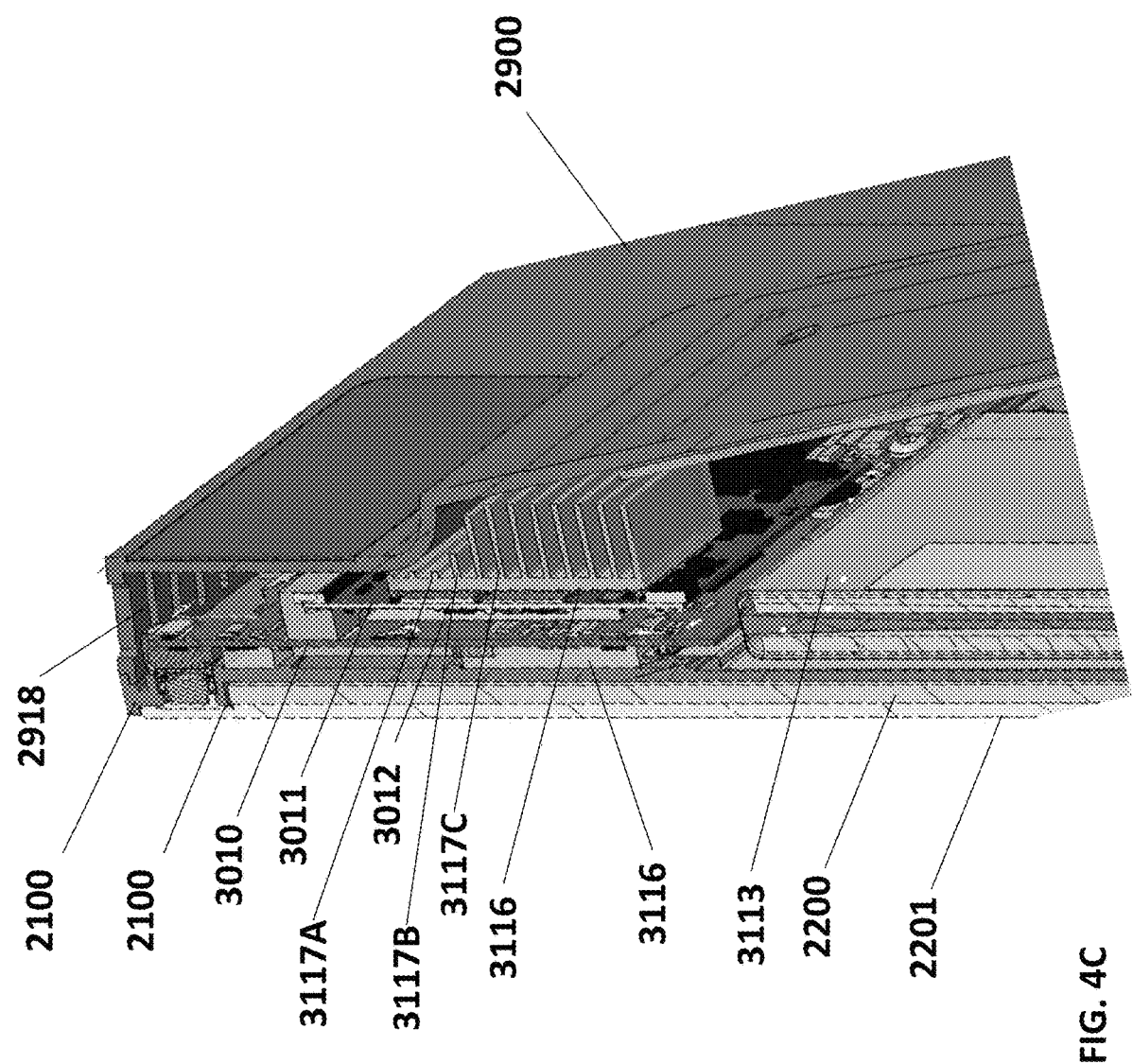

FIGS. 4A-4C illustrate various components and elements positioned within the interior space defined by the chassis 2100 and the back cover 2900.

Referring first to FIGS. 4A-4B, the main circuit boards and electrical components of the local appliance 2000 are illustrated. As will be seen in the exemplary system several main circuit boards are provided including: (i) a main carrier board 3010; (ii) an embedded display port (eDP) bridge board 3020; (iii) an input/output docking board 3030; and (iv) a LED support board 3130.

In the illustrated example, the main carrier board 3010 includes a system-on-module element which can take the form of a Qualcomm Snapdragon based SOM. A communication chipset (which may utilize any suitable communication protocol or standard such as 4G or 5G) may be located on the carrier board and a connection may be made between the carrier board 3010 and an antenna 3112 to enable wireless communications. A system battery 3113 is positioned between the main carried board 3110 and the input/output docking board 3130 and between the main carrier board 3110 and the LED support board 3130

The main carrier board may be connected to other components in the system via any suitable connecting structures including hard connections, ribbon connectors, wires, etc. in the example of FIGS. 4A-4B, for example, wires 3114 are used to connect components on the main carrier board 3110 to the speakers while one or more ribbon connectors are used to connect the main carrier board 3110 to the eDP bridge board 3020.

In the examples of FIG. 4A-4B, the use of the eDP bridge board 3020 and ribbon connectors coupling the bridge board 3020 to the main carrier board 3110 form a easily modifiable flexible PCB component contains the connections necessary to both receive signals form the main carrier board 3110 corresponding to the images to be displayed on the display screen 2200 and to provide the signals necessary to drive the specific display screen component used in the system. This use of the flex-PCB component provides a high degree of flexibility that permits the main circuit board components of the illustrated system to be used, with no or minimal modification, with different display elements. For example, for display screens that can receive the signals generated natively by the display processing board or the I/O board, the flex-PCB element may contain only connectors that pass the signals from the display processing board (or I/O board) to the display. If an alternate display is used (e.g., one from a different manufacturer, or having a different screen size) then the flex-PCB element can be modified to include the connections and/or processing components necessary to convert the signals provided by the display processing board (or I/O board) into signals suitable for driving the alternative display. Thus, the flex-PCB element permits the basic core components of the local appliance 2000 to be used with a variety of different displays and/or different display sizes (e.g., 10 inch, 12 inch, 14 inch).

As best shown in FIG. 4B, in the exemplary embodiment a heatsink 3116 is coupled to the rear portion of the main carrier board to dissipate heat generated by the components on the board.

Referring back to FIG. 4A, it will be noted that several of the components that generate meaningful heat during their operation (specifically the infra-red illuminators 2410, 2410, the speakers 2610, 2620, the eye-tracker 2500, and the LED light interactive device 2700) are all located towards the bottom of the appliance) such that heat generated from such components will tend to rise within the device. In particular, it will be appreciated from FIGS. 4A and 4B that—with the exception of the components on the carrier board—the heat producing elements identified above (specifically the speakers, IR illuminators, and eye tracker) are all located within the lower ⅓ of the appliance 2000. Considering FIGS. 4A and 4B in connection with FIGS. 3E and 3F, it will also be appreciated that the lower thermal vents 2916 are also located lower ⅓ of the appliance 2000. This arrangement of several heat-producing components and the lower thermal vents in the lower ⅓ of the appliance will result in the establishment of an airflow path, such that ambient air will be pulled into the interior of the appliance through the lower side thermal vents as the air heated by the identified heat-producing components rises and up and out the top thermal vents 2918 This created flow path will cause air to pass over substantially all of the major components of the system including, specifically, the heat sink 3116.

As reflected in FIG. 4B, the heat sink 3116 is arranged such that, when the appliance is resting on a surface, it has a plurality of fins extending, in a substantially horizontal direction. This arraignment thus results in a structure where the airflow created through the arrangement of the arrangement of the thermal vents 216 and 218 will result in an air flow that primarily directly impacts only the lowers horizontal fin. As such, the lower fin can provide a form of a "thermal buffer" between the airflow rising through the interior of the appliance and the other horizontal fins of the heat sink 3116 which will not encounter such a direct flow.

Additional details concerning certain thermal management techniques are reflected in FIG. 4C.

Turning to FIG. 4C a side cutaway view of an exemplary local appliance device 2000 is shown. As depicted, the device includes a back cover element 2900 that defines a plurality of top thermal vents 2918. The back cover element 2900 is coupled to the front chassis element 2100, portions of which are labeled in FIG. 4C.

In FIG. 4C, an LCD display element 2700 is positioned with a recess of the front chassis and a protective cover 2201 is positioned over the LCD display. A main carrier board 3010 is positioned within an interior space defined by the combination of the front chassis element 3100 and the back cover element 2900. In the example of FIG. 4C a sub-board containing a system on module board 3011 is coupled to the main carrier board 3010. In one exemplary embodiment, the SOM board 3011 can include a suitable SOM system, such as the Qualcomm® SnapDragon™ SOM. In the exemplary embodiment, the SOM board 3011 incudes a processor 3012.

As depicted in FIG. 4C, a heat sink 3116 is arranged such that it rests substantially over the processor 3012 on the SOM board 3011. Although not specifically illustrated in FIG. 4C, thermal past may be used between the heat sink 3116 and the components on the SOM board 30111 that it overlies (e.g., the processor 3012) to promote thermal conduction between the components and the heat sink. It will be appreciated that thermal paste can be used in any regions of the illustrated system wherein thermal conductivity is desired to be established or maintained. In addition to—or as an alternative to—the use of thermal past, conductive tape may be used to promote and maintain thermal contact.

In the example of FIG. 4C, the heat sink 3116 is positioned substantially in the top ⅓ of the appliance 2000, when the appliance is resting on a generally flat surface. The heat sink 3116 is also positioned such that its centerline (across the width of the heat sink) is substantially aligned with the centerline of the overall appliance (with respect to the width of the appliance. It will be noted that the heat sink 3116 in FIG. 4C defines a number of horizontally extending ribs and that the horizontal length of the ribs varies form the top to the bottom of the heat sink. Thus, for example, the heat sink 3116 defines a first rib 3117A having a horizontal length that is less than the horizontal length of a second rib 3117B. Still further, in the example, the heat sink 3116 defines a third rib 3117C that has a horizontal length that is greater than that of the second rib 3117B.

In the illustrated structure of FIG. 4C thermally conductive gap pad 3118 (e.g., a pad formed from MCS30 material) is positioned in a space between a portion of the front chassis 2100 that supports the LCD and the main carrier board 3110. The use of such a gap pad helps promote thermal transfer between such components.

As shown in FIG. 4C a battery 3113 is positioned within the interior space defined by the front chassis element 2100 and the back cover element 2900 at a location below the heat sink 3116 and the main carrier board 3010.

It will be appreciated that, in the illustrated example described above, the thermal management features discussed herein provide a significant degree of cooling such that significant heat-producing components can be used without the need of a powered air-moving device, such as a fan. Alternate embodiments are envisioned, however, where active cooling (e.g., a fan) can be used without departing from the teachings of the present disclosure.

In certain applications, for privacy and other reasons, it may be desirable for the local appliance to not retain—or even possess at any time—information or data that can be readily used to unique identify the specific human individual being interviewed. In other words, in certain applications it may be beneficial—to the extent possible—to ensure that the discernment process is effectively anonymous in terms of associating the received data and the resultant discernment analysis with a specific unique individual. Various processes and methods may be built into the local appliance to achieve this goal.

In one exemplary embodiment, a unique identifier may be generated for each interviewee that is not directly usable to determine the identity of the human being interviewed.

In this embodiment, the system (ether within a given human interface system or in the discernment server system) may—at the inception of an interview—generate a random identifier for that interviewee, provide the random identifier to a user of the system (such that the user could associate the interview with a specific human individual) and then provide a discernment report that provides the analytical output for that specific random identifier. The human user of the system, then, could use the report to make a determination with respect to the human individual (e.g., whether to allow them to pass through security).

The code or token used in the processes described above need not be generated randomly as long as the code or token itself cannot readily be used to identify a specific human individual. As such, the code or token could be simply a sequential number associated with a specific human interface system, a string based on non-identity data (e.g., a string identifying a location, a human interface system station and, the specific date and time the interview was initiated).

Still further the code or token used by a discernment system constructed in accordance with the teachings of the present disclosure may be generated externally (through a process where the external system that could retain an association of the token with a specific human individual), such that there is an external system that may associate the code or token with a specific human identity, but where the discernment system does not have data that readily enables such an association. For example, if a discernment system constructed according to teachings of this disclosure is used for airport access control, the airport may have a system that generates—for each user—a airport travel ID that is associated with a particular user or a particular flight reservation. That travel ID could then be provided by the airport (or used by the airport to generate a further code or token) that is then provided to the discernment system. In such a situation, the data provided to, and processed by, the discernment system could not be used directly to identify a unique human identity associated with a given interview. The airport system, however, which would have data linking the code or token provided to the discernment system to a given unique individual.

The code or token described herein may take several forms. For example, it could take the form of a paper printout that is scanned or read. It could take the form of a physical token provided to a potential human interviewee. It could further take the form of information reflected in a visual display, such as a QR code on a smartphone display.

One limitation of the approach described above (where anonymous codes or tokens are used to identify each interviewee) is that the data captured and analyzed for purposes of the interview assessment could potentially be analyzed to determine the specific human identity of the interviewee. For example, even if an anonymous code or token is used to identify an interviewee, if a malicious actor were to obtain video associated with the interview or an audio of the interview, they may be able to analyze and/or process the captured audio or video data to determine the human identity of the individual associated with the interview (e.g., through facial or voice recognition processes). To protect against such possibilities, embodiments are envisioned wherein some or all of the individual human interface systems within the discernment system may perform a process to anonymize certain sensor data as it is received (or prior to its transmission to the discernment server system).

For example, in one of many envisioned embodiments, a software, hardware, or combination software/hardware process may be used to transform certain individual sensor data as it is received into data that cannot be readily used to reconstruct the originally received signal and/or determine the unique identity of the human associated with the received signal. In accordance with such embodiments a received signal (such as a video or audio signal) may be passed through statistical processing and/or an alternative process (e.g., an obfuscation process) to generate a signal that contains or identifies the informational content necessary for the desired discernment analysis (e.g., content that enables determination of the overall body posture of the interviewee but that does not enable the use of facial recognition software).

In alternate embodiments, signals received at the human interface system by sensors may not be modified directly, but rather may be aggregated with other received signals to form an aggregated data package that may then be processed in such a way (e.g., through statistical manipulation or passage through a one-way process) to generate a data package that may be adequately used for discernment analysis but cannot be readily used to identify the specific human individual that resulted in the generation of the data.

In certain embodiments, only some of the signals received by the human interface system may be anonymized. Signals not readily associated with a particular human identity, such as weight, temperature, heart rate, need not necessarily be anonymized. Signals more readily associated with a specific individual, such as the audio or visual signals, however, may be processed to generate anonymous data using one or more of the processes described herein.

As a still further embodiment, applications may be envisioned wherein it may be desirable to anonymize data as described herein throughout the system, but still retain the ability—in very limited instances and subject to very tight user access controls—to associate signals associated with a given interview with a specific human interviewee. In such instances one or more limited access hardware (or software or biometric or a combination) keys or tokens may be generated that are capable of reversing the anonymization process and recapturing either the original interview data and/or other data that would allow an authorized user to associate a given interview with a unique human identity. In such embodiments, the ability to anonymize data generally would be limited by the security measures associated with the described keys or tokens. Such systems may be operated with mandatory access controls (MACs) and/or discretionary access controls (DACs) such as are used in trusted computing environments.

In the embodiments discussed herein, the time relationships between one or more of the various attributes detected by the appliance 2000 and each other and/or the time relationships between one or more of the various attributes detected by the appliance 2000 the stimuli provided to the human interviewee can be used for assessing the state of the human interviewee. For example, a facial expression or a change in vocal pitch time-associated with the provision of a specific stimuli may be indicative of one state, while the same detected attribute may be meaningless if not time associated with such stimuli. As another example, the time coincidence of one attribute, such as a specific facial brow position and another attribute, such as a change in pupil size, may be indicative of deception or a concerned state, while the individual occurrence of either attribute may not. To permit the determination of time relationships, the disclosed appliance 2000 can include features and processes for time synchronization.

In the disclosed exemplary appliance, various components operate at different speeds. Thus, for example, the eye tracker could be updated data at a 120 Hz frequency, while the received audio data could be updated at a 32 KHz frequency, while the received video data could be updated at a 60 Hz rate, while the interview script is rendered at a 60 Hz rate as well. To permit time synchronization of the provided stimuli and the received sensor data, the disclosed system can implement a process such as the one depicted in FIG. 5.

In such an embodiment, the appliance 2000 is used to generate multiple data streams during each interview. Each data stream can comprise data that is continuously streamed from the appliance to the cloud-based discernment system 1100. Such streams can include, for example, an audio data stream, a data stream reflecting the received video data, and a data stream reflecting eye tracking data. Each of the data streams will be time stamped such that each data item (or each interval of data items) will be associated with a specific timestamp.

The timestamps provided with each data stream may be either associated with a specific given time at the appliance 2000 (e.g., a local time indictor), a generally running timestamp for the specific appliance, or a relative timestamp associated with a time interval that begins when the first interview question is posed to the interview. The appliance may further provide data associating timestamps with the start and stop points for each question posed to the interview and the start and stop times of each answer provided by the interviewee. In this manner, the cloud-based discernment system will be provided with the data sufficient permit it to associate the received streaming signals from the appliance with the questions posed during the interview. The cloud-based discernment system can then corollate and synchronize the received streaming signals with the various questions and answers and use the same to analyze the received data.

Figure 5:
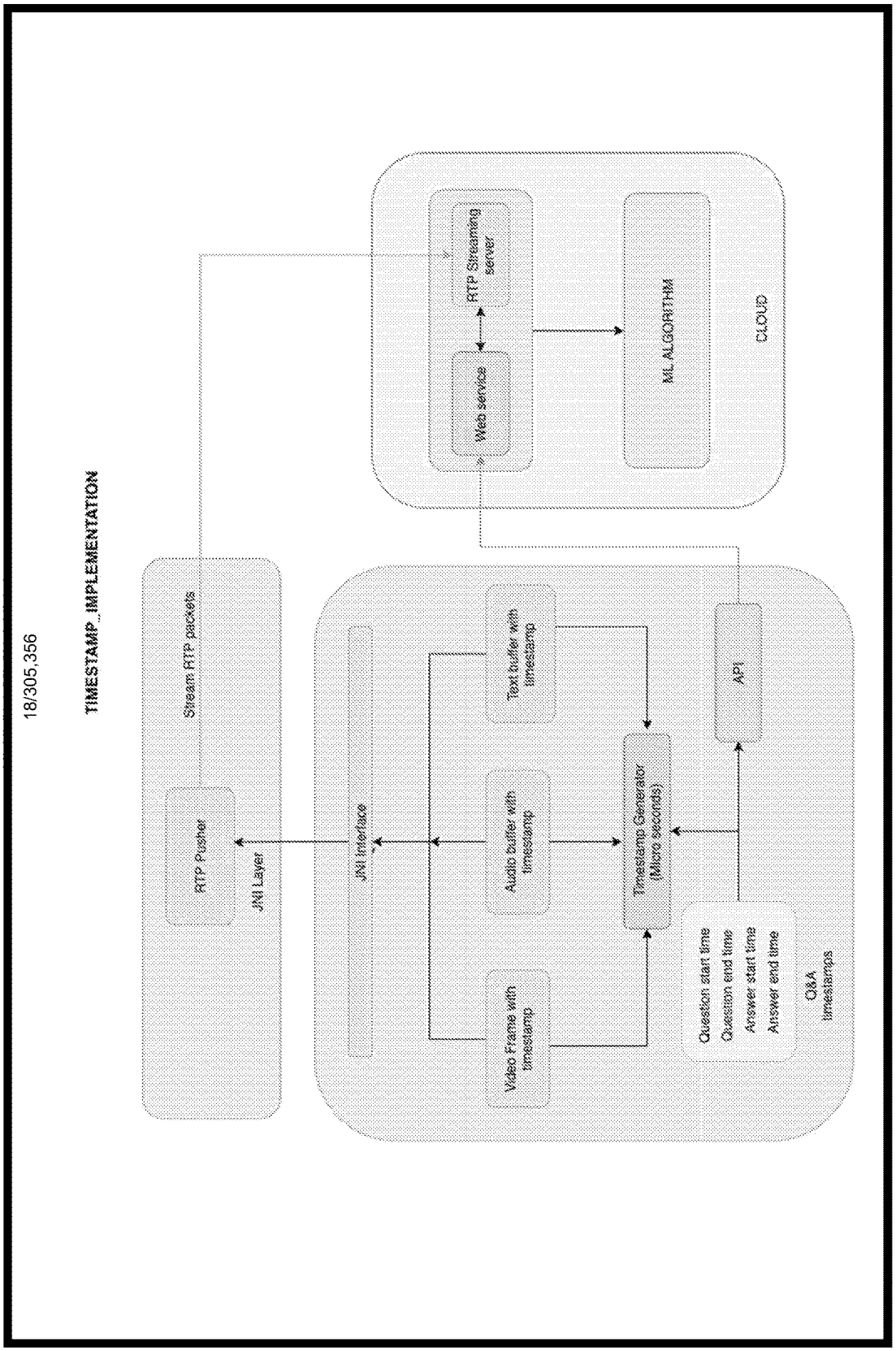
FIG. 5 illustrates aspects of an exemplary process that permits time synchronization of the provided stimuli and the received sensor data.

FIG. 5 illustrates one exemplary embodiment for providing the timestamped data streams and the question and answer meta-data discussed above. Referring to the figure, the illustrated system includes a timestamp generator that generates time stamps in microseconds. As described above, the timestamp generator can be a continuously running generator, one that tracks local time, and/or one that generates time stamps beginning at an initial time (e.g., start of interview). As reflected in FIG. 5, the generated timestamps are then associated with video frames, audio buffered frames, or eye tracker buffered frames (which in the illustrated example are provided as test frames) and the time stamped video, audio and eye-tracker data is then streamed to the cloud-based discernment system through use of a JNI interface and a RTP pusher. Thus, through use of the system described above, the exemplary appliance provides independent timestamped-data streams to the cloud-based discernment system.

The specific form of the streaming data provided by the local appliance 2000 may vary depending on the type of data and the particular application to which the local appliance is applied. For example, for the eye tracking data, the streamed data may comprise frames, wherein each frame includes a data set associated with a given timestamp that provides: an indication of whether both the left and the right eye locations were detected, the detected locations (e.g., in X, Y coordinates) for each detected eye, a weighted average between the two eyes (e.g., weighted X and weighted Y locations); a measurement associated with any detected pupil measurements; and/or a detected distance measurement. The cloud-based discernment system can then process the received data to either ignore data deemed invalid, process received data to smooth invalid or aberrational data, and/or generate error information in the event that the received data suggests an error in the system and/or inadequate received data.

Figure 6A:
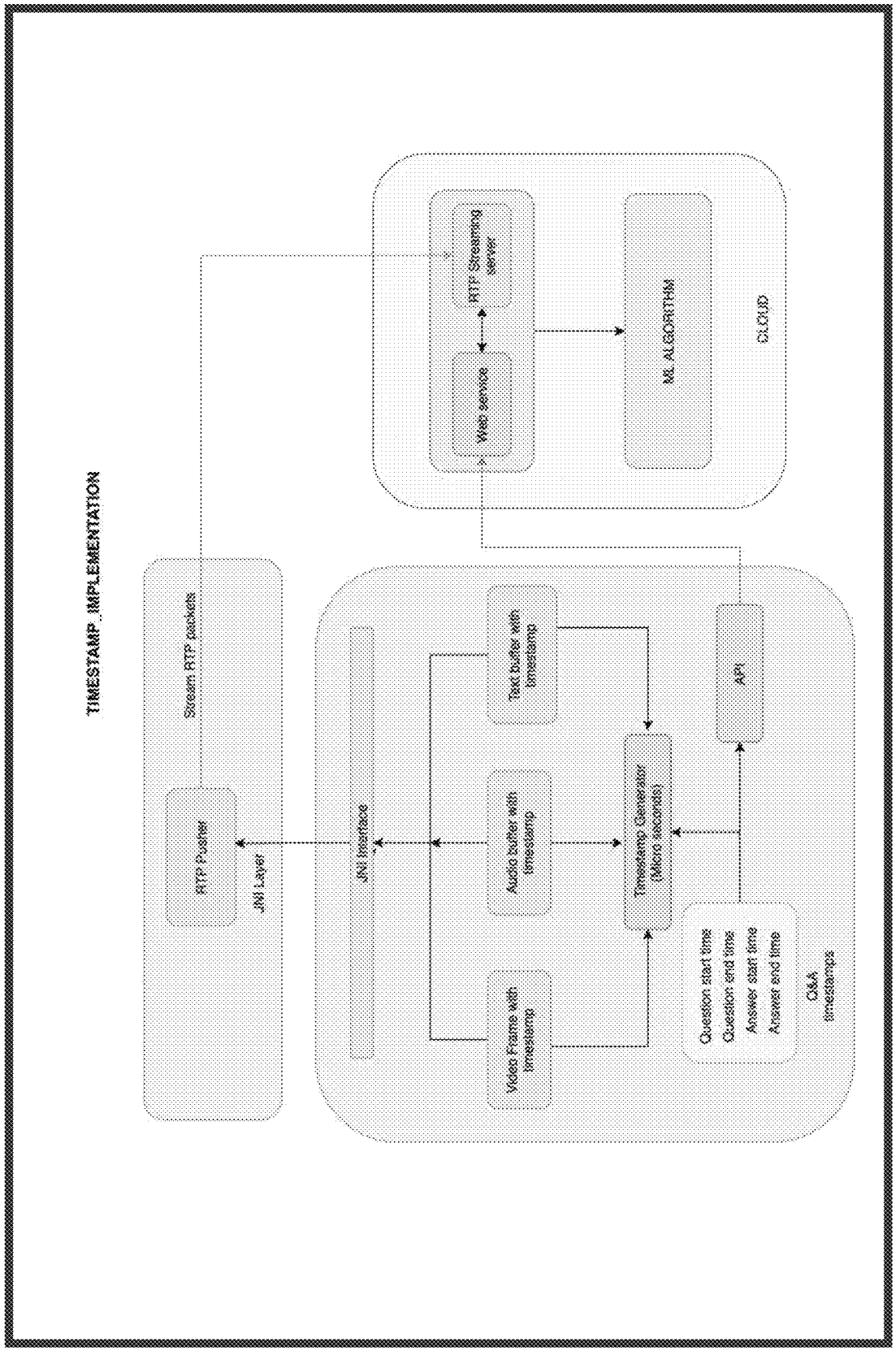
FIG. 6 illustrates an example of the type of data that may be provided for the questions and answers.

In the example of FIG. 5, in addition to providing the timestamped streaming data, the illustrated local appliance also provides—thorough another communication channel— timestamped data associated with the particular questions posed to the interviewee and the answers received. This is done via a separate API interface that provides the cloud-based discernment system, either on a regular basis during an interview or at the conclusion of an interview, information associating the start and stop of each question posed to the interviewee during the interview and the start and stop of each received answer. Such data, in the illustrated example, is provided over an internet-based encrypted communication channel. FIG. 6 illustrates an example of the type of data that is provided for the questions and answers. As reflected in the example, the data provided over the API interface associated timestamps with the start and stop of each question and answer.

It will be appreciated that, in an actual implementation, many local appliances will be operating to provide interviews at the same time. As such, the cloud-based discernment system will be receiving multiple data stream feeds and multiple question and answer feeds. However, since each feed will be associated with a particular unique interview ID, and because all of the provided data will be time-stamped, the cloud-based server will have the ability to synchronize the questions, answers, and received video/audio/eye-tracker data for all interviews such that it can provide assessments and reports for a large number of concurrently occurring interviews. This ability is important for successful operation of a large, scalable, distributed discernment system To control the flow of audio data from the local appliances to the cloud-based processing system, the exemplary embodiment disclosed herein includes apparatus and processes for determining: (1) whether received audio data corresponds to human voice activity and (2) whether received audio data corresponding to voice activity represents a complete response to provided stimuli (i.e., whether received data corresponding to voice activity corresponds to a complete verbal response to a posed questions). These apparatus and process are important in the context of a distributed system, such as the one disclosed herein, because they tend to ensure that only voice activity audio data is transmitted to the cloud processing system (thus avoiding bandwidth burdens that would be associated with transmitting non-voice activity data, such as background noise, non-vocal sounds (e.g., dog barking, etc.)). These apparatus and processes are also significant because they ensure that complete verbal responses to provided stimuli are provided to the cloud processing system (thus promoting overall system accuracy) and they ensure that the system does not move from one provided stimuli to the next (e.g., form one verbal question to the next question) until a complete response to the prior stimuli is received.

Figure 7A:
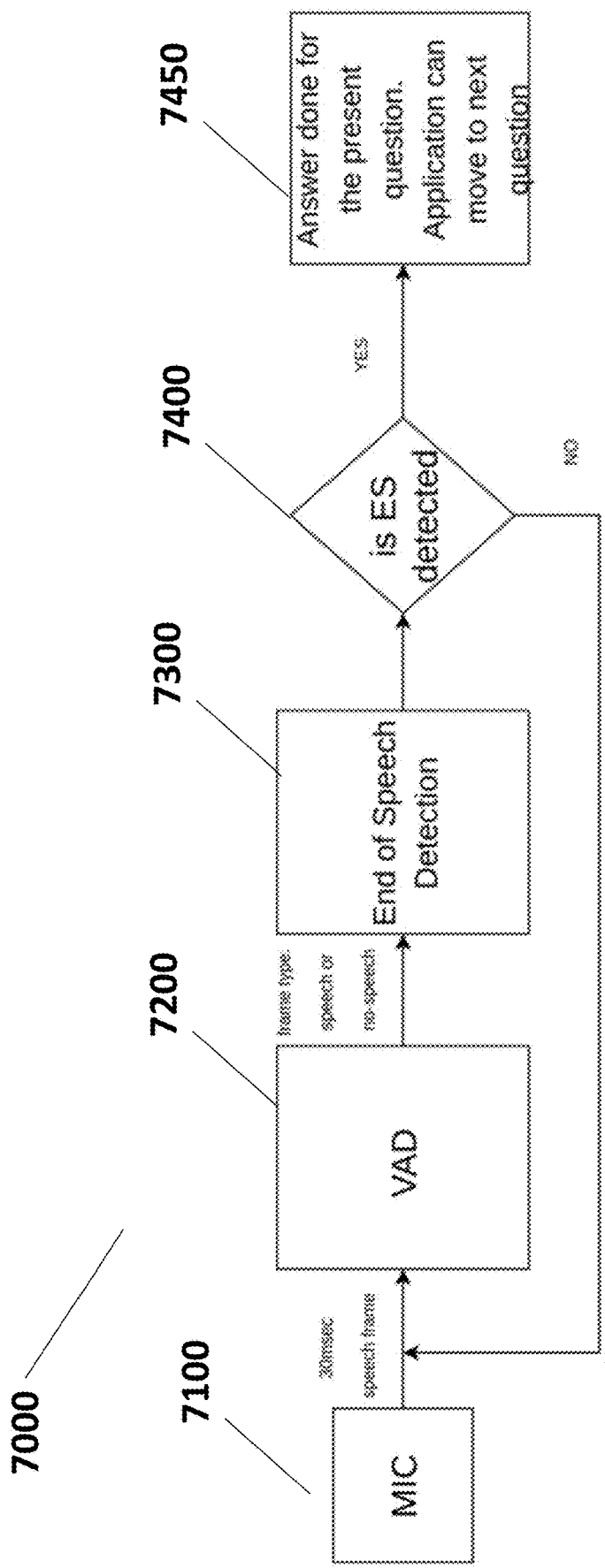
FIGS. 7A-7B shows one process that may be implemented by an end of speech detector to determine whether an end of speech event has occurred.

FIG. 7A illustrates an exemplary system 7000 that may be included and implemented within the apparatus 2000. As reflected in the figure, the exemplary system includes: a microphone 7100; a vocal activity detector 7200; an end-of-speech detector 7300; and some processing logic 7400 and 7450 for advancing to the next stimuli (or to the end of the interview) or to another activity once it is determined that a complete response to the prior question was received.

In the example of 7A, the microphone 7100 may take the form of a mono-microphone sampling generating digital sampled audio signals at a rate of 16 KHz with a sampling rate of approximately 16 bits/second. The voice activity detector 7200, the end of speech detector 7300 and the processing logic 7400 and 7450 may take the form of dedicated processing element (i.e., a dedicated circuit or a FPGA), a programmed processor that also performs other functions, or a combination of a dedicated and programmed element.

In the described embodiment, the sampled audio data from the microphone will be packaged into data frames, each of which will correspond to a particular time period. In one embodiment, each data fame will correspond to a time sampling period of 30 milliseconds.

As reflected in FIG. 7A, each sampled audio frame is processed by the voice activity detector 7200 to determine whether the sampled audio within the frame includes data corresponding to human voice activity. This processing can be accomplished in a variety of different ways. In accordance with one embodiment, this processing is accomplished by taking the sampled audio signal, splitting it into frequency bands corresponding to frequencies associated with human voice activity and then determining: (i) whether the total power associated with the human-associated frequencies is above a minimum threshold (which would suggest human speech directed to the microphone 7100) and, if so, (ii) whether the data associated with the various frequency bands is likely to be associated with human voice activity.

Once the received data frame is processed by the voice activity detector 7200, the received audio frame can be passed to the end-of-speech detector 7300 along with an indication of whether the received audio frame is associated with speech or no speech. The end of speech detector 7300 can then process the received data to determine whether an end-of-speech event has occurred (e.g., whether a complete verbal response to prior stimuli has been received).

Figure 7B:
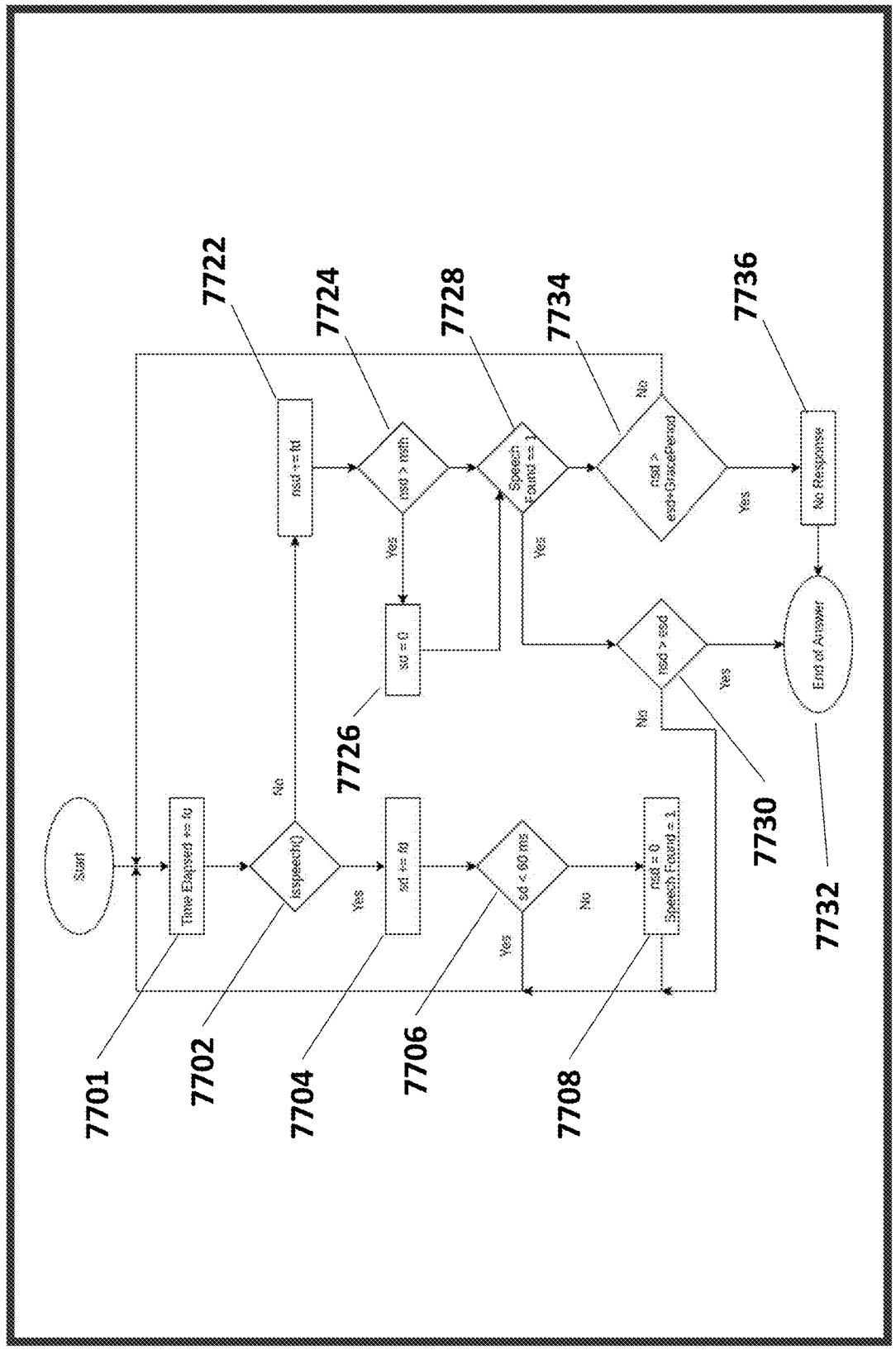

FIG. 7B shows one process that may be implemented by the end of speech detector A300 to determine whether an end of speech event has occurred. In the illustrated example, the end of answer process is initiated each time a new question is posed to an interview during an interview.

Turning to the figure, at a step 7701, the end-of-speech detector 7300 will receive the audio data and will initially wait until the time interval elapsed since the last processing step is equal to or greater than the frame duration ("fd") such that the system has a full frame of audio data. In the depicted example, the frame duration is set at 30 msec.

Once a frame of audio data has been received, the system will move to step 7702 and analyze the data from the vocal activity detector to determine whether the received audio frame corresponds to human speech. If the received frame DOES correspond to human speech the system will then update the speech duration interval ("sd" in the example) by adding to the previous interval the time that has elapsed since the last processing step occurred. This is done at step 7704.

The system will then proceed to step 7706 where it will determine whether the previously received and running detected human vocal activity period is less than a given threshold period (in the example, twice the frame duration or 60 ms). This step is used to determine whether the receive human activity is—in fact—speech (which will typically have a duration in excess of the given threshold period) or some other form of human generated sound. If it is determined that step 7706 that the previously received running detected human vocal activity IS above the given threshold period, then the system will conclude that speech is found and set the no speech duration to zero and set a speech found indicator to indicate that speech has been detected at step 7708. The system will then go back to step 7701 and await the receipt of a subsequent audio frame.

If it is determined in step 7706 that the previously received running detected human vocal activity IS NOT above the given threshold period, then the system will conclude that it is not yet clear whether human speech has been detected and go back to step 7701 and await the receipt of a subsequent audio frame.

If the system determines at step 7702 that NO SPEECH is detected it will then proceed to a step 7722 where a no speech duration counter (nsd) is incremented by adding the interval that elapsed since the last audio frame was processed to the no speech detected counter value. The system will then proceed to a step 7724 where it will determine whether the no speech detection interval is greater than a set noise threshold (nsth). In the illustrated example, the noise threshold (nsth) is set at six times the frame duration (or 300 msec). The purpose of the step 7724 is to determine whether the frame reflecting a lack of human voice activity is indicative of a genuine lack of human speech as opposed to a gap in human vocal activity, such as a gap between spoken words, sentences, or breaths that reflect a lack of instantaneous vocal activity but not a lack of on-going human speech.

If it is determined at step 7724 that the ongoing cumulative period of no human vocal activity has exceeded the noise threshold, the system will conclude that there is no ongoing human speech and re-set the speech duration (sd) (e.g., to zero) at step 7726.

If it is determined at step 7724 ongoing cumulative period of no human vocal activity is less than the noise threshold, the system will not reset the speech duration variable.

Under both circumstances, the system will then proceed to step 7728.

At step 7728, the system will determine whether the speech found variable was previously set or not. This step will reflect whether the current period of no human vocal activity follows a period where speech had been detected (such that it may reflect the end of an answer—as opposed to the lack of any answer).

If the system determines that the present period does follow a period where speech had been detected (e.g., one where "Speech Found" had been set) the system will then proceed to step 7730 where it will determine whether the current cumulative period of no speech detected (nsd) exceeds the period set for the end of speech threshold (esd). In the exemplary embodiment under discussion, the end of speech threshold is set at 1.5 seconds of continuous no speech. If it is determined that the end of speech threshold has been exceeded (after an interval of detected speech) the system will determine that the end of the answer has been provided and proceed to step 7732. If not, the system will return to step 7701 and await the receipt of the next frame of audio data.

If the system determines at step 7728 that the current period of no speech detected does NOT follow a period where speech had been detected (which could exist where a question has been posed but no answer had been received) the system will then proceed to step 7734 where it will determine whether the current period of no speech exceeds both the end of speech threshold (esd) plus a grace period. In the illustrated example, the grace period is set at 0.5 seconds. The purpose of step 7734 is to provide the interview with an amount of time in excess of the end of speech threshold to begin answering a question. This "grace period" is required because it will take the interviewee some amount of time to process any provided questions and begin answering. If the system determines at step 7734 that the combined period associated with the end of speech threshold and the grace period has NOT been exceeded, the system will return to step 7701 and await the next frame. If the system determines that the combined period exceeds the end of speech threshold plus the grace period, it will proceed to step 7736 where it will determine that no response to the presented question was provided, set a no response indicator, and proceed to step 7732 where the system will conclude that the end of the answer to the posed question (in this case the answer being the lack of any verbal response).

At step 7732, the system can then proceed to present the next question to the interviewee, if any interview questions remain to be asked, or to an end of interview process of no questions remain.

In the examples of 7A and 7B, the various values used for the end of answer assessment were fixed. Alternat embodiments are envisioned wherein some or all of the assessment parameters are varied. For example, is some embodiments, the maximum no speech threshold ("esthr") used to detect an end of speech event could vary depending on the specific stimuli presented to the interviewee. Thus, for example, the maximum no speech threshold could have one value for posed questions that require minimal mental processing (or thinking) on the part of the interviewee (e.g., 3 seconds) and a different vale (e.g., 6 seconds) for questions or stimuli requiring additional processing. Such variations could be associated with different stimuli types (e.g., no thinking, minimal thinking, intense thinking) in which case the stimuli data provided by the cloud processing system for a given stimuli could indicate the stimuli type. Additionally, or alternatively, some or all of the provided stimuli data could provide specific end-of-speech detection parameters for those stimuli.

In addition to varying the end of speech detection process in response to the type of provided stimuli, still further alternate embodiments are envisioned wherein the end of speech detection parameters are varied based on known conditions associated with the interviewee. For example, certain of the processing parameters could be varied based on the age of the interviewee with interviewees younger than 20 being processed using one set of parameters, interviewees between 20 and 60 years of age with another set of parameters, and interviewees over 60 using yet another set of parameters.

In the exemplary embodiment only audio data is used to assess whether an interviewee has provided no response or has reached the end of a response to a question posed in an interview. Alternative embodiments are envisioned wherein additional data feeds are used to assess whether an interviewee has provided a response or has reached the end of an answer. For example, in one alternative embodiment visual camera data can be used to assess whether, over a given audio frame, the interviewee is exhibiting mouth movement. Such an assessment can be made by determining whether, over a given audio frame determined to be associated with human speech, the interviewees mouth is moving. If it is determined that, over a sufficient number of consecutive audio frames over which human vocal activity is detected, there is no corresponding interviewee mouth movement, a no speech (or no response or end of answer) determination can be made.

Note that the use of visual data in connection with the no response/end of answer assessment can also be used to determine whether identified human vocal activity corresponds to vocal activity of the interviewee. Such uses can be beneficial in environments where the interview is being conducted in an environment wherein human vocal activity other than activity from the interviewee may be detected by the local appliance used for conducting the interview. For example, in an airport screening situation, an interview of one interviewee may be conducted at the same time as other interviews are being conducted in a nearby location with other devices and interviews and/or other ambient human vocal activity may be detected by the microphone(s) within the local appliance conducting the interview. In such situations, use of visual data FIG. 7C illustrates an exemplary embodiment wherein both audio data and visual data are processed to detect an end of answer/end of speech condition and/or a no response condition.

Figure 7C:
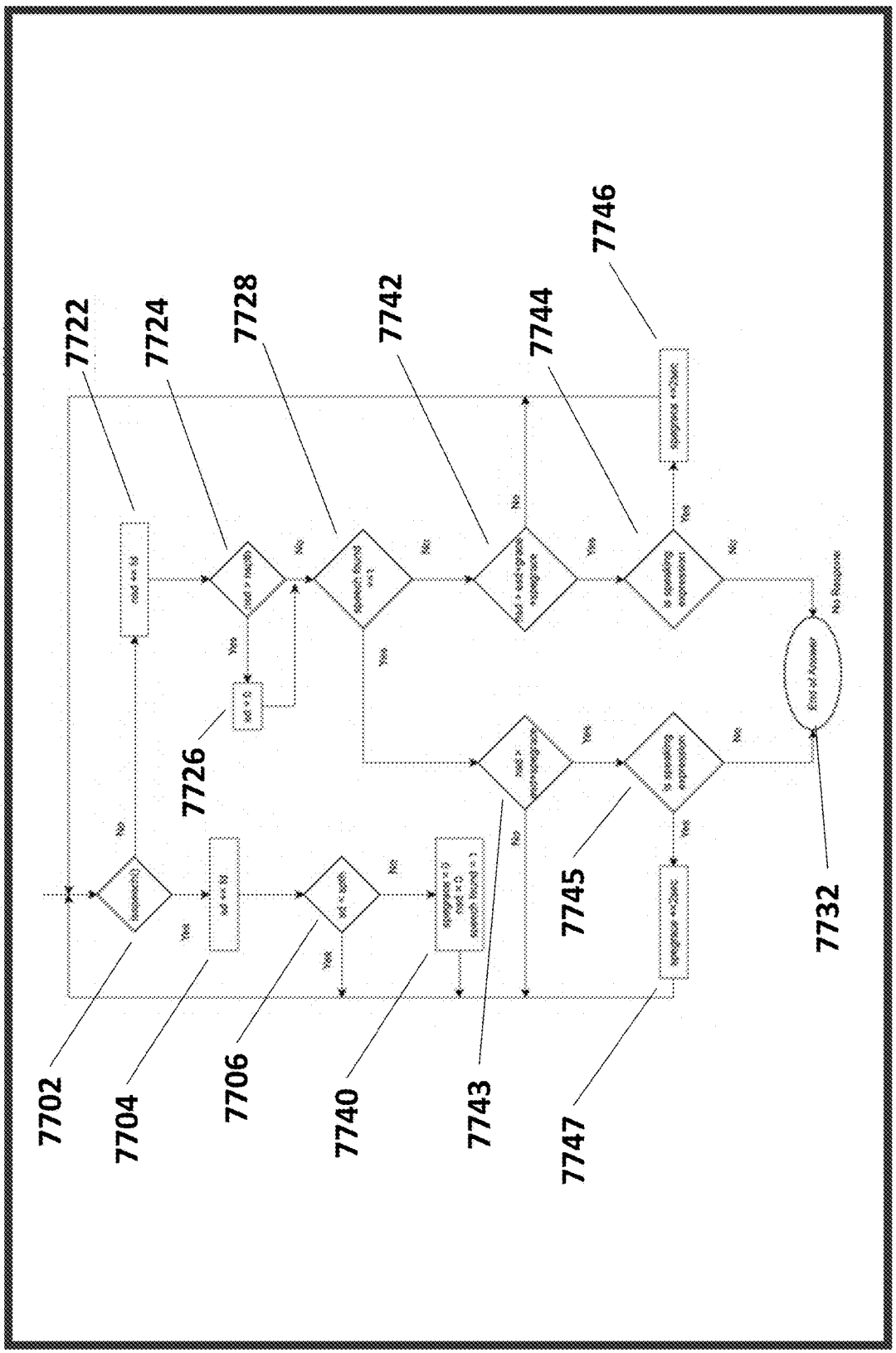
FIG. 7C illustrates an exemplary embodiment wherein both audio data and visual data are processed to detect an end of answer/end of speech condition and/or a no response condition.

Turning to FIG. 7C, elements and steps having reference numbers used in connection with FIG. 7A or 7B have the same functionality. As reflected in FIG. 7C, the process operates in a manner similar to that described above in connection with FIG. 7B except that a determination is made, in steps 7745 or 7744, as to whether a speaking expression has been detected from processing the visual data. The existence of a speaking expression, e.g., a detection of mouth or lip movement, provides an indication that the interview is about to begin speaking, is still speaking and/or is moving their mouth in a manner associated with speaking.

In the example, of FIG. 7C, the detection of a speaking expression, in either of steps 7744 or 7745, will result in the incrementing of a speaking grace counter in one of step 7746 or 7747. The system will then use a period associated with the sum of the end of speech period ("esd") plus the running speaking grace period ("spegrace") at step 7743 to determine whether an end of answer condition exists (for situations where speech was previously detected) or the sum of the esd period, plus the spegraceperiod, plus the beginning answer grace period ("grace") to determine whether a no response condition exists at step 7742.

Note that, in the example of FIG. 7C, the speaking grace counter is reset (or set to 0) at the beginning of the process and/or in step 7740 (which follows a detection of speech).

The disclosed distributed system allows for the generation of reports that may be defined and accessed by a limited set of administrators.

For example, in one embodiment, the system 2000 can provide a report site that is accessible only to specifically authorized to access the site. The report site may contain reports, or data from which reports can be generated, associated with interviews conducted for that specific administrator. Because the data associated with each interview were provided to the could-based discernment system 1100 on an anonymous basis, the reports will typically be identified in the Report Site by one or more of: (a) the date, time, location and/or specifically associated interview appliance associated with the interview; (b) a specific interview identifier (e.g., custom generated interview code) and/or (c) other potentially identifying information associated with some or all of the interviews.

The interview reports generated by the disclosed system can take a variety of different formats and can be accessed in a variety of different ways.

Figure 8A:
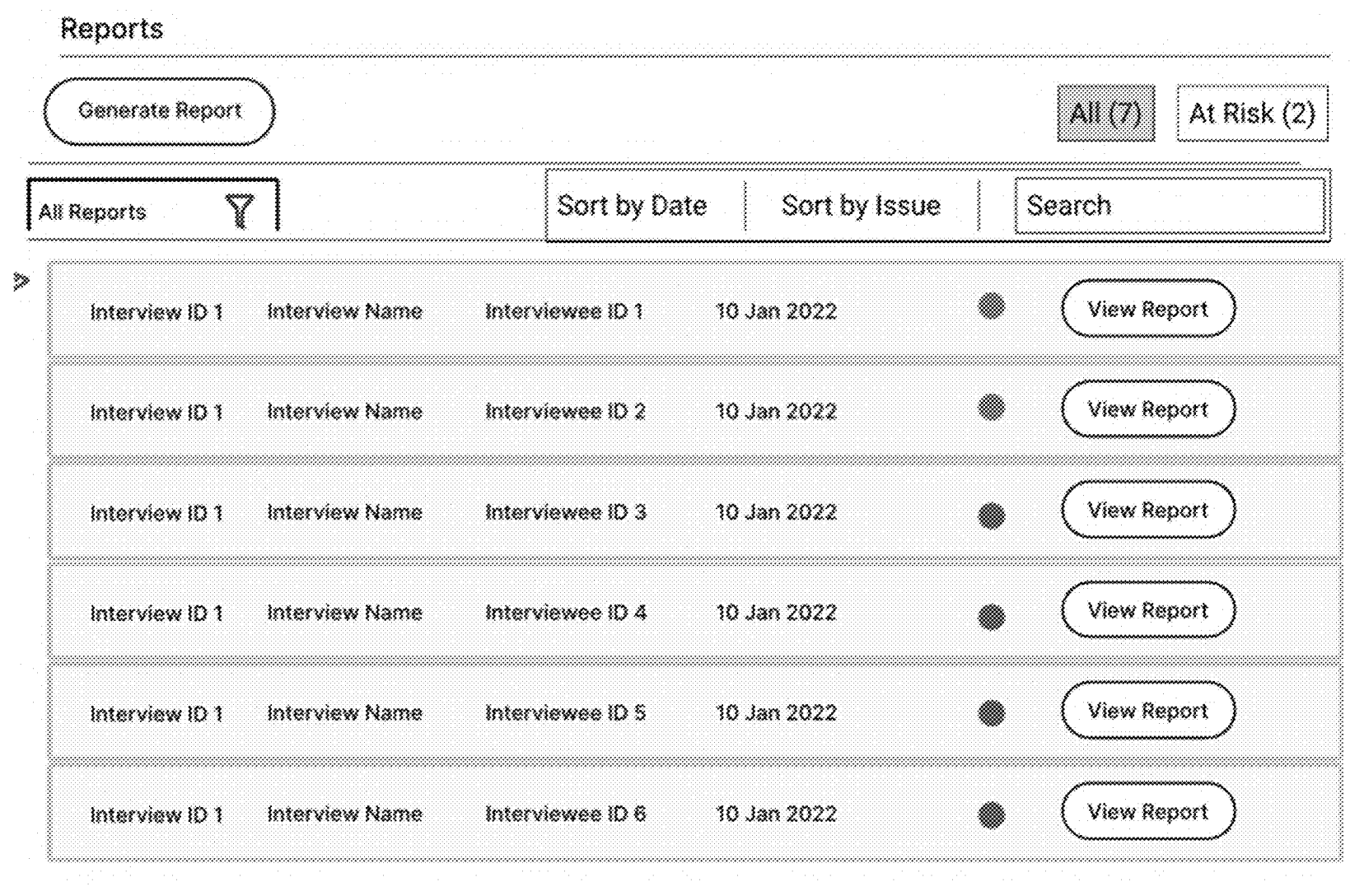

FIG. 8A illustrates an exemplary report interface.

Referring to FIG. 8A, a report interface is illustrated that may be accessed by a given Administrator through a Dedicated Tenant Portal, a protected virtual machine running on a shared device, or hosted site. Note that the report interface, and the reports data, may—in some embodiments—be accessible only by tenant representatives such that they would not be maintained or stored within the could-based discernment system.

Referring to FIG. 8A, it will be seen that the reports can be associated with interview IDs, the name of a specific interview (so that similar interviews can be grouped) and/or a specific interviewee ID. The reports can also be associated with an interview date and/or an indication of the type of issue or issues addressed during the interview (e.g., initial screening, security, theft detection, etc.).

In the example of FIG. 8A, color-coded identifiers are provided for each interview to indicate whether the particular interview associated with the identifier poses any significant risk factors. The nature and threshold for the provision of such identifiers can be set such that a given identifier (e.g., RED for heightened risk) can be provided when a report meets a first set of criterial a further identified (e.g., GREEN) can be provided when a second set of criterial is met and other identifiers (e.g., YELLOW) can be provided when yet other criteria sets are met.

A view report tab can be provided for each interview.

Figure 8B:
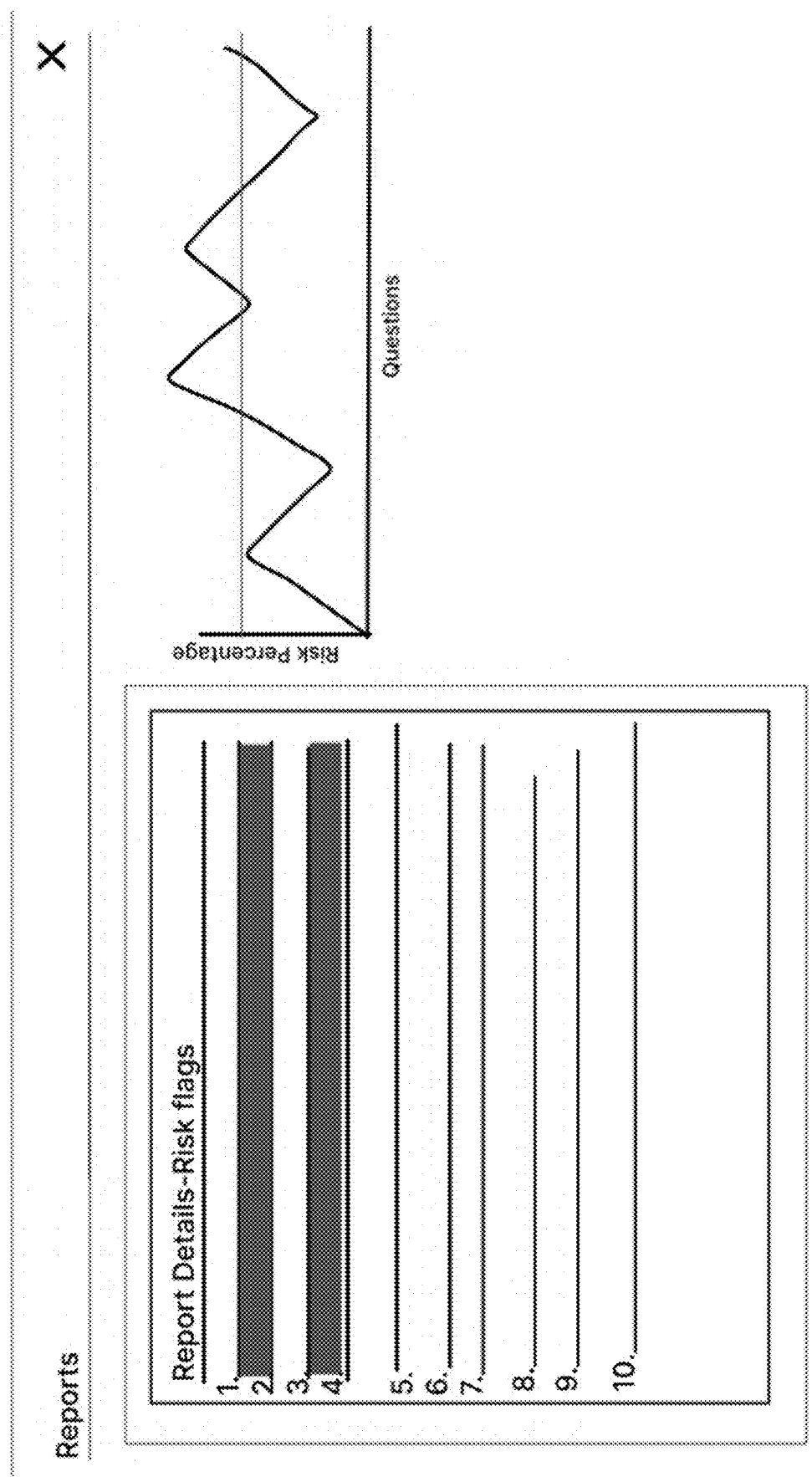
FIG. 8B illustrates an example form of an interview report.

FIG. 8B illustrates an example form of an interview report.

Referring to FIG. 8B, the depicted exemplary interview Report provides a risk assessment for each question posed during the interview both in terms of a general qualitative assessment (Normal, High Risk, Moderate Risk) and a graphical numerical assessment. To highlight HIGH risk questions, the report may include color highlights (or other highlights) that emphasis questions for which HIGH risk responses.

In addition to the general qualitative assessment, the interview Report may provide a quantitative assessment of each response to an interview question in the form of a Risk Percentage. Such an assessment may take the form of a numerical value where the numerical value is mapped against a threshold reflecting a normal risk response.

Through the use of the qualitative and quantitative information provided in the interview Report, the reviewer of the report can determine whether any further actions are required or appropriate.

It will be appreciated that the administrative functions enabled by the disclosed system can be provided in a variety of different ways for different users of the system. For example, the nature of the disclosed system allows the functions provided by the system to be provided by three different physical or logical function systems or layers: (1) an edge device layer or system that provides the interface between the system and the interviewees; (2) a discernment detection layer or system and (3) an administrative layer or system.

In the disclosed example, the edge detection functionality is provided by the local appliances 2000 and the discernment detection is provided by the cloud-based discernment detection server 1100.

In that example the administrative functionality can be provided by one or more administrative interfaces 1300 operating in isolation, in cooperation with other interfaces 1300 and/or in conjunction with aspects of the cloud-based discernment system 1100.

For purposes of the following discussion, a "tenant" is intended to refer to an organization or entity that is using the disclosed discernment system 1000 to arrange and conduct interviews and to receive and review reports related to those interviews. A tenant may be, for example, an airline, a boarded security service, an employer, an access control group (e.g., a group controlling entry/exit access to/form a sporting event), or any other organization desiring use of the discernment detection system.

In accordance with one exemplary embodiment the data and activities associated with multiple tenants can be supports by the discernment detection server 1100 (or services) such that the operator of the servers 1100 supports and provides the administrative functionality to the various tenants. In such an embodiment, however, no specific resources would be shared among different tenants and each tenant would access and operate the system within an isolated private (or virtual private) network. In this embodiment, it will be appreciated that each tenant will operate using the services provided by the cloud-based discernment servers 1100 but on a different, and securely isolated, private network.

In other embodiments, one or more tenants may require that their tenant administrative functions be provided at locations—or using equipment—completely under their control. Such embodiments may be required, for example, where a local boarder security organization or a local corporate entity wishes to maintain complete control over all administrative data. As noted above, in certain implantations of the system under discussion, all data received and transmitted by the local appliances 1200 to the could-based discernment detection servers 1100 is anonymized such that only certain tenant-accessible resources could have access to data that would allow one to associate an interview—and any interview associated data or reports—with a given human individual. To enable tenants desiring complete control over such—and other data—all administrative functionality that could be used to uncover or infer certain sensitive information (such as the human identity associated with any interview, interview data or report. In such embodiments, most of the administrative functions will be provided by on-site administrative functionality. In such examples, the local appliance devices 1200 will be used to unanimously collect and transfer data to the cloud-based discernment detection servers 1100 and the cloud-based discernment detection servers 1100 will be used to generate reports and transmit such reports to the various tenant-specific devices providing the administrative functions. Thus, in these embodiments, the discernment-detection interviews, analysis, and reporting is all done in an anonymous environment using non-tenant specific hardware and networks, while some or all of the administrative functionality that could be used to determine or infer the human-specific interviewees, are provided by tenant-implemented, tenant-controlled hardware and networks.

The Communication Links: The communication links between the human interface systems and the discernment server system may take any suitable form, such as wired connections or wireless connections. In certain embodiments involving mobile devices, the communication channels may include wireless communications with some or all of the human interface systems (e.g., through high-speed, high-bandwidth 5G connections) coupled with downstream wired connections or further wireless connections.

Encryption: As a security measure, all or part of the data used in a discernment system constructed in accordance with teachings of this disclosure may be encrypted both as it is communicated across any communication link and as processed within the system. Thus, for example, the data received by the human interface system may be encrypted, the data transmitted from the human interface system to the discernment server system may be encrypted, and all reports and/or analysis generated by the discernment server system may be encrypted. Note that any such encryption could be distinct from—or integrated with—the anonymous processes discussed previously.

Thus, for example, one could encrypt data that has not been anonymized (such as a non-anonymized video file). While such a file would be encrypted—in the sense that it would not be readily accessed by those not authorized to receive and view such data—it would not be anatomized because anyone able to decrypt the data file could then use it to identify the unique human associated with the file.

In other embodiments one could both anonymize and encrypt data used by the discernment system either through separate processing steps or through an integrated process where input non-anonymous data is both anonymized and encrypted through a single process step.

As is known to those sufficiently skilled in the art, in addition to using encryption to protect the data from observation, encryption may be used to authenticate the data. That is to say that a device holding a private encryption key may encrypt that data such that it may be verified as being encrypted by that device at a later time.

In the exemplary embodiment disclosed herein, a multi-layered approach can be implemented to secure the data used by the system, both with respect to any stored data and/or with respect to the transmission of data.

Data in transmission can be secured and protected by using one or more secure transmission protocols, such as one of the various transport layer security protocols (e.g., TLS 1.2).

In terms of stored data, the data can be stored in an encrypted format and access to the stored data can be limited to accessed users through the use of conventional security, network security, operating system controls are applied to protect the data from security vulnerabilities.

The Discernment Server System: In one exemplary embodiment the discernment server system (or systems) will take the form of a server or multiple servers that communicate with the human interface systems to at least: (a) provide most or all of the information necessary to provide stimuli to the interviewee for an interview; (b) receive detected interview data from the human interview systems; (c) process received detected data in light of the provided stimuli to generate further stimuli interactions with an interviewee and/or to assess and analyze the received signals and to provide a report or indication reflecting the underlying state of the human interview; and/or (d) provide an interface into the discernment server system that may be used to modify the system, adjust the nature of one or more interviews, directly communicate with a human interface system, monitor an interview in real time, or request to generate various reports. Other functionality may be enabled by or within the discernment server system.

The precise process by which the discernment server system assesses the underlying state of a human interviewee may vary significantly. For example, in applications where the system is deployed to detect deception at an airport access point, the discernment server system may include one or more machine learning models—created through the use of significant test data—that correlate certain received signals from the human interface system with deception. For example, in applications where an interviewee is asked whether they are transporting certain contraband, and a question is posed with a visual depiction of the contraband, the vocal inflection of the interviewee along with an assessment of the interviewee's eye gaze pattern (e.g., are the focusing on or avoiding focusing on the displayed contraband in an unusual manner) can provide an indication about whether the interview is being truthful in their response. Various approaches for detecting the state of a human interviewee using received sensor data are discussed and disclosed, for example, in U.S. Patent Application Publication No. 2013/0266925.

The physical implementation of the discernment server system may take many forms. In one embodiment the discernment server system may be a computer server (or group of servers) dedicated solely to the distributed discernment system. In other embodiments the discernment server system may be implemented virtually in the cloud such that it is not temporally linked to any specific physical hardware. Hybrid approaches are also envisioned.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A distributed discernment system comprising:
a discernment server including a processer running a diagnostic program and a communications interface permitting bi-directional communications to and from the discernment server;
a plurality of human interface devices, each human interface device including a speaker for presenting audible stimuli to a human interviewee, a microphone, a processor running a local processing program, and a system interface permitting bi-directional communications between the human interface device and the discernment server; and
a communications network permitting bidirectional communications between the discernment server and each of the plurality of human interface devices wherein:
the diagnostic program running on the discernment server is adapted to generate interview instructions to be provided to the plurality of human interface devices over the communications network, wherein the instructions provided to a given human interface device cause the human interface device to present audio stimuli to the human interviewee in a form of a verbal question;

each of the plurality of human interface devices is adapted receive interview instructions from the discernment server over the communications network and a local processing system is configured, in response to such instructions, to:
  present audible stimuli to the human interviewee in the form of the verbal question;
  receive sensor data from the microphone following the presentation of the audible stimuli;
  process the microphone sensor data to determine whether the microphone sensor data corresponds to a complete human voice response to a presented verbal question; and
  if the microphone sensor data is determined to be a complete human voice response to the presented verbal question, provide data to the discernment server indicating that a complete response to the presented verbal question has been received; and the discernment server is adapted to receive data from each of the plurality of the human interface devices and analyze such data to provide an assessment of a state of the human interviewee interacting with each such human interview device.

2. The distributed discernment system of claim 1 wherein, each of the plurality of human interface devices further comprises an eye tracker, and wherein:
  the microphone generates a timestamped audio data stream;
  the eye tracker generates a timestamped eye tracking data stream, and wherein each of the plurality of human interface devices further comprises:
    means for streaming the timestamped eye tracking data stream and the timestamped audio data stream to the discernment server in such a manner that data streams are associated with an interview ID;
    means for generating timestamps associated with a start and stop points of the presentation of the verbal question to the human interviewee interacting with such device;
    means for generating timestamps associated with the start and stop points of a human interviewee's response to the presented verbal question; and
    means for transmitting to the discernment server timestamped data associated with the start and stop points of the presented verbal question and timestamped data associated with the start and stop points of the human interviewee's response to the presented verbal question.

3. The distributed discernment system of claim 2 wherein the timestamped eye tracking data stream and the timestamped audio data stream are transmitted to the discernment server over a first communication channel and the timestamped data associated with the start and stop points of the presented verbal question and the timestamped data associated with the start and stop points of the human interviewee's response to the presented verbal question are transmitted to the discernment server using a second channel, where the first communication channel and second channel are different communication channels.

4. The distributed discernment system of claim 3 wherein, over at least one given time period:

a first one of the plurality of human interface devices is adapted to associate with a first interview ID: (i) the timestamped eye tracking data stream from a first device; (ii) the timestamped audio data stream from the first device; (iii) the timestamped data from the first device associated with the start and stop points of a presented audible question; and (iv) timestamped data from the first device associated with the start and stop points of a first human interviewee's response to the presented audible question; and a second one of the plurality of human interface devices is adapted to associate with a second interview ID: (i) the timestamped eye tracking data stream from a second device; (ii) the timestamped audio data stream from the second device; (iii) the timestamped data from the second device associated with the start and stop points of the presented audible question; and (iv) timestamped data from the second device associated with the start and stop points of a second human interviewee's response to the presented audible question; and the first interview ID is different from the second interview ID.

5. The distributed discernment system of claim 1 wherein each of the plurality of human interface devices includes on or more processing elements adapted to:
  package the microphone sensor data into audio data frames, with each audio data frame corresponds to the microphone sensor data received over a particular time period;
  process each audio data frame to determine whether a sampled audio within the audio data frame includes data corresponding to human voice activity; and
  provide an indication, for at least a plurality of the audio data frames, whether the data within the audio data frame corresponds to human voice activity or not.

6. The distributed discernment system of claim 1, wherein each of the plurality of human interface devices further includes an end of speech detector for determining when the human interviewee has provided a complete response to a provided first audible question and a local processor is configured to present a second stimuli in the form of a second audible question to the interviewee upon the determination that the human interviewee has provided a complete response to the first audible question.

7. The distributed discernment system of claim 6 wherein each of the plurality of human interface devices determines that a complete response to a first stimuli was provided by comparing a detected period of no human speech to a no speech threshold, and wherein the no speech threshold for a first audible question presented by the human interface device varies from the no speech threshold for a second audible question presented by the human interface device.

8. A human interface appliance for use in a distributed discernment system, the human interface appliance comprising:
  a front chassis element defining a first generally flat section and a second section located below the first generally flat section, where the second section extends generally outwardly from the first generally flat section at an angle such that, when the human interface appliance positioned on a flat surface, the second section will be generally angled upwards with respect to a human interacting with the human interface appliance;
  an eye tracker for detecting movement of eyes of the human interacting with the human interface appliance, the eye tracker being associated with the second section of the front chassis element, and positioned such that, when the human interface appliance is positioned on a flat surface, the eye tracker will be generally angled upwards from a horizontal within a range of ten to twenty degrees;

a display screen configured to provide visual stimuli to the human interacting with the human interface appliance, the display screen being associated with the first generally flat surface of the human interface appliance and positioned such that, when the human interface appliance is positioned on a flat surface, the display screen is above the eye tracker;

a digital camera for capturing a facial image of the human interacting with the human interface appliance, the digital camera being positioned such that, when the human interface appliance is positioned on a flat surface, the digital camera is above the display screen; and a first speaker for providing audible stimuli to the human interacting with the human interface appliance;

a microphone configured to provide an output signal corresponding to received audio;

means for causing the display screen and the speaker to present visual and audible stimuli to a human interacting with the human interface appliance, wherein the audible stimuli includes the presentment of a first audible question to the human; and means coupled to receive the output signal from the microphone and determine whether a received audio signal corresponds to human voice activity representing a complete response to the first audible question.

9. The human interface appliance of claim 8 wherein the human interface appliance defines a width and an outer edge, wherein the human interface appliance further comprises an ambient light sensor, and wherein:
the digital camera is positioned at approximately a midpoint of the width of the human interface appliance; and
the ambient light sensor is positioned in approximately a same horizontal plane as the digital camera at a location closer to the digital camera than the outer edge of the human interface appliance.

10. The human interface appliance of claim 9 wherein the microphone is a multi-element microphone and a first element of the microphone is positioned closer to the digital camera than the outer edge of the human interface appliance- and a second element of the microphone is positioned closer to the outer edge of the human interface appliance than to the digital camera.

11. The human interface appliance of claim 8 wherein:
the front chassis element further comprises a third section that is angled such that, when the human interface appliance is positioned on a flat surface, the third section will be generally angled downwards with respect to the human interacting with the human interface appliance;
the human interface appliance further comprises a second speaker; and
the first and second speakers are positioned to emit sound through openings in the third section of the front chassis element.

12. The human interface appliance of claim 11 further comprising a light emitting diode assembly positioned between the first and second speakers.

13. The human interface appliance of claim 8 wherein the means coupled to receive the output signal from the microphone and determine whether the received audio signal corresponds to human voice activity representing a complete response to the first audible question comprises a processor programed to:
package the output signal from the microphone into audio data frames, with each audio data frame corresponds to sensor data provided by the microphone over a particular time period;
process each audio data frame to determine whether sampled audio within the audio data frame includes data corresponding to human speech; and
provide an indication that a complete response has been received when it is determined that a period of no detected human speech has occurred following a detection of a period of human speech.

14. The human interface appliance of claim 13 wherein the processor is programed to detect a period of human speech following a presentation of the first audible question, and wherein the period of no detected human speech used to determine whether a complete response has been received to the first audible question is based on an extent to which the response to the first audible question will require mental processing on a part of the human.

15. A method of discerning a state of a human in a distributed discernment system, the method comprising the steps of:
presenting audible stimuli to the human in a form of a verbal question and generating timestamped data associated with an end of the presented audible stimuli;
using a microphone to monitor for a potential response to the presented audible stimuli and to generate a microphone output signal;
streaming the microphone output signal to a cloud-based discernment system over a first communication channel;
packaging the microphone output signal from the microphone into audio data frames, with each audio data frame corresponding to the microphone output signal provided by the microphone over a defined time period;
processing each audio data frame to determine whether sampled audio within the audio data frame includes data corresponding to human speech;
determining that the human has provided a complete answer to a presented question when a period of no human speech exceeds a no-speech threshold following an end of the verbal question;
generating timestamped data corresponding to an end of the received answer;
sending timestamped data to the cloud-based discernment system corresponding to an end of a presented verbal question and an end of the verbal over a second communication channel.

16. The method of claim 15 wherein the step of processing each audio data frame to determine whether the sampled audio within the audio data frame includes data corresponding to human speech comprises the step of splitting an audio signal associated with the audio data frame into frequency bands corresponding to frequencies associated with human voice activity, and determining whether a total power associated with a human-associated frequencies is above a minimum threshold.

17. The method of claim 15 further comprising the step of determining that the human has started to provide an answer to the presented verbal question when a period human speech is detected within a first period of time following an end of the presented question and generating timestamped data corresponding to a start of the received answer; and wherein the step of sending timestamped data to the cloud-based discernment system corresponding to the end of the presented verbal question and the end of the presented question, further includes sending timestamped data corresponding to the start of the received answer.

18. The method of claim 15 wherein a duration of the no-speech threshold is associated with an amount of mental processing anticipated to be required of the human to respond to the presented question.

19. The method of claim 15 further comprising the steps of:
   using a camera to monitor facial movements of the human and to generate a camera output signal;
   streaming the camera output signal to the cloud-based discernment system over a communication channel; and
   wherein the step of determining that the human has provided a complete answer to the presented question includes the step of processing the camera output signal to determine whether the facial movements of the human indicate a lack of mouth movement.

20. The method of claim 15 further including the step of processing the streamed data within the cloud-based discernment system to assess a state of an interviewed human.

* * * * *